United States Patent
Zhamu et al.

(10) Patent No.: US 11,390,528 B2
(45) Date of Patent: *Jul. 19, 2022

(54) COMBINED GRAPHENE BALLS AND METAL PARTICLES FOR AN ANODE OF AN ALKALI METAL BATTERY

(71) Applicant: Global Graphene Group, Inc., Dayton, OH (US)

(72) Inventors: Aruna Zhamu, Springboro, OH (US); Hao-Hsun Chang, Centerville, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 297 days.

This patent is subject to a terminal disclaimer.

(21) Appl. No.: 16/695,819

(22) Filed: Nov. 26, 2019

(65) Prior Publication Data

US 2021/0155484 A1     May 27, 2021

(51) Int. Cl.
*C01B 32/192* (2017.01)
*H01M 4/62* (2006.01)
(Continued)

(52) U.S. Cl.
CPC .......... *C01B 32/192* (2017.08); *C01B 32/225* (2017.08); *H01M 4/0404* (2013.01);
(Continued)

(58) Field of Classification Search
CPC .... H01M 4/0404; H01M 4/133; H01M 4/134; H01M 4/1393; H01M 4/1395; H01M 4/362; H01M 4/364; H01M 4/381; H01M 4/382; H01M 4/387; H01M 4/42; H01M 4/46; H01M 4/621; H01M 4/625; H01M 4/626; H01M 4/661; H01M 4/663; H01M 4/667; H01M 10/052; H01M 10/0525;
(Continued)

(56) References Cited

U.S. PATENT DOCUMENTS 7,071,258 B1    7/2006  Jang et al.
2005/0271574 A1  12/2005  Jang et al.
(Continued)

OTHER PUBLICATIONS

PCT/US20/62240 International Search Report and Written Opinion dated Apr. 8, 2021, 8 pages.
(Continued)

*Primary Examiner* — Brittany L Raymond

(57) ABSTRACT

Provided is an anode for a lithium battery or sodium battery, the anode comprising multiple porous graphene balls and multiple particles or coating of a lithium-attracting metal or sodium-attracting metal at a graphene ball-to-metal volume ratio from 5/95 to 95/5, wherein the porous graphene ball comprises a plurality of graphene sheets forming into the ball having a diameter from 100 nm to 20 μm and a pore or multiple pores having a pore volume fraction from 10% to 99.9% based on the total graphene ball volume, and wherein the particles or coating of lithium-attracting metal or sodium-attracting metal, having a diameter or thickness from 1 nm to 20 μm, are selected from Au, Ag, Mg, Zn, Ti, K, Al, Fe, Mn, Co, Ni, Sn, V, Cr, an alloy thereof, or a combination thereof.

34 Claims, 10 Drawing Sheets

(51) Int. Cl.
*C01B 32/225* (2017.01)
*H01M 4/38* (2006.01)
*H01M 4/04* (2006.01)
*H01M 4/133* (2010.01)
*H01M 4/134* (2010.01)
*H01M 4/1393* (2010.01)
*H01M 4/1395* (2010.01)

(52) U.S. Cl.
CPC ........... *H01M 4/133* (2013.01); *H01M 4/134* (2013.01); *H01M 4/1393* (2013.01); *H01M 4/1395* (2013.01); *H01M 4/382* (2013.01); *H01M 4/621* (2013.01); *C01B 2204/04* (2013.01); *C01B 2204/32* (2013.01)

(58) Field of Classification Search
CPC .... H01M 10/054; C01B 32/19; C01B 32/192; C01B 32/194; C01B 32/225; C01B 2204/02; C01B 2204/04; C01B 2204/32; C01P 2002/78; C01P 2006/10; C01P 2006/12; Y02E 60/10
See application file for complete search history.

(56) References Cited

U.S. PATENT DOCUMENTS

2008/0048152 A1    2/2008   Jang et al.
2015/0380728 A1*  12/2015   Son ......................... H01B 1/04
                                                       252/502
2016/0298234 A1*  10/2016   Yang ..................... H01M 4/386
2019/0305309 A1*  10/2019   Huang .............. H01M 10/0525
2020/0161634 A1*   5/2020   Kim .................. H01M 10/0525

OTHER PUBLICATIONS

Hummers et al., "Preparation of graphitic oxide" J. Am. Chem. Soc. (1958) vol. 80, p. 1339.

Jang et al., "Processing of Nano Graphene Platelets (NGPs) and NGP Nanocomposites: A Review" J. Materials Sci. (2008) vol. 43, pp. 5092-5101.

Karlicky et al., "Halogenated Graphenes: Rapidly Growing Family of Graphene Derivatives" ACS Nano (2013) vol. 7, No. 8, pp. 6434-6464.

* cited by examiner

COMBINED GRAPHENE BALLS AND METAL PARTICLES FOR AN ANODE OF AN ALKALI METAL BATTERY

FIELD

The present disclosure relates generally to the field of alkali metal battery or alkali metal-ion battery and, more particularly, to a lithium or sodium secondary battery anode having combined multiple graphene balls and particles or coating of a lithium- or sodium-attracting metal, and a process for producing the graphene balls, the electrode and the battery.

BACKGROUND

Rechargeable lithium-ion (Li-ion) and lithium metal batteries (e.g. Li-sulfur, Li metal-air, and lithium-metal oxide batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal. Hence, in general, Li metal batteries have a significantly higher energy density than lithium ion batteries. Similarly, Na metal batteries have a higher energy than corresponding sodium ion batteries.

Historically, rechargeable lithium metal batteries were produced using non-lithiated compounds, such as $TiS_2$, $MoS_2$, $MnO_2$, $CoO_2$, and $V_2O_5$, as the cathode active materials, coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's.

To overcome these safety issues, several alternative approaches were proposed in which either the electrolyte or the anode was modified. The first approach involves replacing Li metal by graphite (a Li insertion material) as the anode. The operation of such a battery involves shuttling Li ions between two Li insertion compounds at the anode and the cathode, respectively; hence, the name "Li-ion battery." Presumably because of the presence of Li in its ionic rather than metallic state, Li-ion batteries are inherently safer than Li-metal batteries. The second approach entails replacing the liquid electrolyte by a dry polymer electrolyte, leading to the Li solid polymer electrolyte (Li-SPE) batteries. However, Li-SPE has seen very limited applications since it typically requires an operating temperature of up to 80° C. The third approach involves the use of a solid electrolyte that is presumably resistant to dendrite penetration, but the solid electrolyte normally exhibits excessively low lithium-ion conductivity at room temperature. Alternative to this solid electrolyte approach is the use of a rigid solid protective layer between the anode active material layer and the separator layer to stop dendrite penetration, but this typically ceramic material-based layer also has a low ion conductivity and is difficult and expensive to make and to implement in a lithium metal battery. Furthermore, the implementation of such a rigid and brittle layer is incompatible with the current lithium battery manufacturing process and equipment.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of graphite anode is <372 mAh/g and that of lithium transition-metal oxide or phosphate based cathode active material is typically in the range from 140-220 mAh/g. As a result, the specific energy of commercially available Li-ion cells is typically in the range from 120-240 Wh/kg, most typically 150-220 Wh/kg. These specific energy values are significantly lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. Among various advanced energy storage devices, alkali metal batteries, including Li-air (or Li—$O_2$), Na-air (or Na—$O_2$), Li—S, and Na—S batteries, are especially attractive due to their high specific energies.

The Li—$O_2$ battery is possibly the highest energy density electrochemical cell that can be configured today. The Li—$O_2$ cell has a theoretic energy density of 5.2 kWh/kg when oxygen mass is accounted for. A well configured Li—$O_2$ battery can achieve an energy density of 3,000 Wh/kg, 15-20 times greater than those of Li-ion batteries. However, current Li—$O_2$ batteries still suffer from poor energy efficiency, poor cycle efficiency, and dendrite formation and penetration issues.

One of the most promising energy storage devices is the lithium metal anode based battery, such as lithium-sulfur (Li—S) cell, since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8 + 16Li \leftrightarrow 8Li_2S$ that lies near 2.2 V with respect to $Li^+/Li°$. This electrochemical potential is approximately ⅔ of that exhibited by conventional positive electrodes (e.g. $LiMnO_4$). However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Assuming complete reaction to $Li_2S$, energy densities values can approach 2,500 Wh/kg and 2,800 Wh/l, respectively, based on the combined Li and S weights or volumes. If based on the total cell weight or volume, the energy densities can reach approximately 1,000 Wh/kg and 1,100 Wh/l, respectively. However, the current Li-sulfur cells reported by industry leaders in sulfur cathode technology have a maximum cell specific energy of 250-350 Wh/kg (based on the total cell weight), which is far below what is possible.

In summary, despite its great potential, the practical realization of the Li—S battery has been hindered by several obstacles, such as dendrite-induced internal shorting, low active material utilization efficiency, high internal resistance, self-discharge, and rapid capacity fading on cycling. These technical barriers are due to the poor electrical conductivity of elemental sulfur, the high solubility of lithium polysulfides in organic electrolyte (which migrate to the anode side, resulting in the formation of inactivated $Li_2S$ in the anode), and Li dendrite formation and penetration. The most serious problems of Li metal secondary (rechargeable) batteries (including all sorts of cathode active materials, such as S, Se, NCM, NCM, other lithium transition metal oxide, sodium-transition metal oxide, etc.) remains to be the dendrite formation and penetration, high solid-electrolyte interfacial impedance, and poor cycle life. Sodium metal batteries have similar problems to address.

Furthermore, it has been challenging and expensive to deposit or attach a layer of lithium metal (or sodium metal) on surfaces of an anode current collector (Cu foil). There is a need to reduce the amount of lithium metal or sodium metal in the anode of a lithium metal or sodium metal battery. It would be desirable and preferable if the presence of a lithium or sodium metal layer (film, foil, or coating) is eliminated when the cell is made. The lithium metal or sodium metal is then supplied from the cathode side (e.g. lithium transition metal oxide or sodium transition metal oxide) during the subsequent battery charging operations.

It is an object of the present disclosure to overcome most of the afore-mentioned problems associated with current lithium metal batteries or sodium metal batteries. A specific object of the present disclosure is to provide graphene ball-based anode of a lithium metal and sodium metal secondary battery that exhibits long and stable charge-discharge cycle life without exhibiting lithium or sodium dendrite problems.

SUMMARY

The present disclosure provides an anode electrode for an alkali metal battery (lithium or sodium metal battery or combined Li/Na metal batteries) and a process for producing such an anode. The disclosure also provides a lithium metal battery, a sodium metal, or combined Li/Na metal battery containing such an anode electrode.

In certain embodiments, the disclosure provides an anode for a lithium battery or sodium battery, the anode comprising a combination of multiple porous graphene balls and particles or coating (or thin film) of a lithium-attracting metal or sodium-attracting metal at a graphene ball-to-metal volume ratio from 2/98 to 98/2, wherein the porous graphene ball comprises a plurality of graphene sheets (preferably each having a length or width from 5 nm to 100 µm) forming into the porous graphene ball having a diameter from 100 nm to 20 µm and a pore or multiple pores and wherein particles of the lithium-attracting metal or sodium-attracting metal, having a diameter or thickness from 1 nm to 20 µm, are selected from Au, Ag, Mg, Zn, Ti, Na, K, Al, Fe, Mn, Co, Ni, Sn, V, Cr, an alloy thereof, or a combination thereof. The metal particles or coating are disposed outside of the graphene balls or on exterior surfaces of the graphene balls.

The porous graphene ball (also herein referred to as the porous graphene particulate) can be substantially spherical, ellipsoidal, elongated, or irregular in shape. The porous graphene ball preferably comprises a pore or a plurality of pores having a pore volume fraction from 10% to 99.9% based on the total graphene ball volume.

In certain embodiments, the anode further comprises a current collector having two primary surfaces, wherein the multiple porous graphene balls and multiple particles of a lithium-attracting metal or sodium-attracting metal form a layer of a uniform mixture of graphene balls and metal particles and such a mixture layer may be deposited on one or two primary surfaces of the current collector.

In some embodiments, the anode further comprises a current collector having two primary surfaces, wherein the multiple particles or coating of a lithium-attracting metal or sodium-attracting metal are deposited on exterior surfaces of the graphene balls to form a layer or two layers of metal-decorated or metal-coated graphene balls that are deposited on one two primary surfaces of the current collector. The exterior surface of a graphene ball may be coated with a coating layer of lithium-attracting metal or sodium-attracting metal. Alternatively, the exterior surface of a graphene ball may be decorated with fine particles (nano-scaled) of a lithium-attracting metal or sodium-attracting metal. These metal particle-decorated or metal-coated graphene balls are then packed, with or without a binder or adhesive, into an anode active material layer.

In some embodiments, the anode further comprises a current collector having two primary surfaces, wherein multiple porous graphene balls form a discrete graphene ball layer and multiple particles or coating of a lithium-attracting metal or sodium-attracting metal form a discrete metal layer overlaying the discrete graphene ball layer and wherein either the discrete metal layer or the graphene ball layer is deposited on or supported by the current collector. One primary surface of the current collector may be deposited with a discrete metal layer first, which is then deposited with a discrete graphene ball layer. Alternatively, one primary surface is deposited with a discrete graphene ball layer first, which is then deposited with a discrete metal layer. (This discrete metal layer may be further deposited with another discrete graphene ball layer.) In certain preferred embodiments, each of the two primary surfaces is deposited with a 2-layer structure of discrete graphene layer/discrete metal layer or a 3-layer structure of discrete graphene ball layer/discrete metal layer/discrete graphene ball layer.

Thus, in certain embodiments, the anode further comprises a current collector having two primary surfaces, wherein the multiple porous graphene balls form at least a discrete graphene ball layer and the multiple particles or coating of a lithium-attracting metal or sodium-attracting metal form at least a discrete metal layer and wherein at least one of the two primary surfaces is deposited with one discrete graphene ball layer overlaying one metal layer. The metal layer may be further overlaid with another graphene ball layer to form a three-layer structure of graphene ball layer/metal layer/graphene ball layer and one or two of the primary surfaces is each deposited with such a three-layer structure.

The graphene sheets contain single-layer or few-layer graphene, wherein the few-layer graphene sheets have 2-10 layers of stacked graphene planes having an inter-plane spacing $d_{002}$ from 0.3354 nm to 0.60 nm as measured by X-ray diffraction and the single-layer or few-layer graphene sheets contain a pristine graphene material having essentially zero % of non-carbon elements, or a non-pristine graphene material having 0.001% to 25% by weight of non-carbon elements.

The non-pristine graphene may be selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

In certain embodiments, the graphene ball or particulate further comprises therein an adhesive, an electron-conducting, or an ion-conducting material (lithium ion-conducting or sodium ion-conducting) as a binder or matrix material that helps to hold multiple graphene sheets in a ball together or to provide additional transport channels for lithium or sodium ions, if so desired. The electron-conducting material may be selected from an intrinsically conducting polymer, a carbon (e.g. amorphous carbon, polymeric carbon or carbonized resin, CVD carbon, etc.), a pitch material, a metal, or a combination thereof, wherein the metal (as a conductive additive or binder) can include or not include Au, Ag, Mg, Zn, Ti, Li, Na, K, Al, Fe, Mn, Co, Ni, Sn, V, Cr, or an alloy thereof.

The intrinsically conducting polymer is preferably selected from (but not limited to) polyaniline, polypyrrole, polythiophene, polyfuran, polyacetylene, a bi-cyclic polymer, a sulfonated derivative thereof, or a combination thereof.

The lithium ion-conducting material may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

In certain embodiments, the lithium ion-conducting material in the graphene ball contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium (LiN($CF_3SO_2$)$_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

In some embodiments, the ion-conducting material comprises a lithium ion-conducting polymer selected from polydially dimethyl-ammonium chloride (PDDA), polysodium 4-styrenesulfonate (PSS), polyethylene glycol tert-octylphenylether (PEGPE; $C_{14}H_{22}O(C_2H_4O)_n$, n=9-10), polyallyl amine (PAAm; $(C_3H_5NH_2)_n$), poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a sulfonated derivative thereof, or a combination thereof. In some embodiments, the lithium ion-conducting material in the graphene ball comprises a sulfonated polymer, which is typically conductive to lithium ions or sodium ions.

The graphene ball or particulate may further contain an electron-conducting material, disposed therein, selected from expanded graphite flake, carbon nanotube, carbon nano-fiber, carbon fiber, carbon particle, graphite particle, carbon black, acetylene black, pitch, an electron-conducting polymer, or a combination thereof. The electron-conducting polymer may be selected from (but not limited to) polyaniline, polypyrrole, polythiophene, polyfuran, polyacetylene, a bi-cyclic polymer, a sulfonated derivative thereof, or a combination thereof. Any intrinsically conductive polymer may be used for this purpose.

The graphene particulate may be pre-loaded with lithium or sodium metal (impregnated into the core of the particulate) before the battery is made. Alternatively, the anode of the intended alkali metal battery contains a lithium source or a sodium source, in addition to the graphene balls and the Li- or Na-attracting metal particles. The lithium source is preferably selected from foil, particles, or filaments of lithium metal or lithium alloy having no less than 80% by weight of lithium element in the lithium alloy. The sodium source is preferably selected from foil, particles, or filaments of sodium metal or sodium alloy having no less than 80% by weight of sodium element in the sodium alloy.

In the lithium or sodium metal battery, each cell contains an anode layer, as disclosed herein, comprising the graphene balls and particles of Li- or Na-attracting metal, which are pre-loaded with lithium or sodium or accompanied by a layer of Li or Na ion source. When the battery is discharged, lithium or sodium ions are released from the particulates or the Li or Na ion source and moved through an electrolyte/separator to the cathode comprising a cathode active material layer. The graphene particulates may help to accommodate some lithium or sodium when the battery is subsequently recharged. However, the Li- or Na-attracting metal particles, disposed outside of and nearby the graphene balls in the anode layer, shall presumably interact with the Li or Na ions returning from the cathode, forming an alloy (between the metal and Li/Na atoms) and re-depositing Li or Na ions onto a desired location on the current collector.

In some embodiments, the lithium or sodium metal battery further comprises a separator, discrete anode current collector (e.g. Cu foil) in contact with the disclosed anode. Multiple graphene balls and multiple particles of the Na/Li ion attracting metal may be uniformly mixed together to form a single layer. Alternatively, particles of the Na/Li-attracting metal may form a discrete layer (e.g. deposited on a Cu foil surface) and multiple graphene balls form a separate, discrete layer (e.g. deposited onto the metal layer). Typically, there is a separate, discrete cathode current collector (e.g. Al foil) in contact with the cathode active material layer (containing cathode active material, such as $MoS_2$, $TiO_2$, $V_2O_5$, $LiV_3O_8$, S, Se, metal polysulfide, NCM, NCA, or other lithium transition metal oxides, etc.), which is supported by (coated on) the Al foil.

In some embodiments, the anode of the lithium cell or sodium cell comprises the presently disclosed anode of graphene balls and metal particles, but without the presence of a lithium or sodium metal layer (no particle, film, foil, or coating of Li or Na metal) when the cell is made. The lithium metal or sodium metal is then supplied from the cathode side (e.g. lithium transition metal oxide or sodium transition metal oxide) during the first and subsequent battery charging operations. This avoids the need to deal with lithium metal or sodium metal (highly sensitive to oxygen and moisture in the room air) during battery fabrication. It is challenging and expensive to handle lithium or sodium metal in a manufacturing facility.

In some embodiments, the graphene particulate, when measured without non-graphene ingredient inside the ball, has a density from 0.05 to 1.7 g/cm$^3$ and a specific surface area from 50 to 2,630 m$^2$/g. In certain embodiments, the particulate, when measured without other ingredients, has a density from 0.1 to 1.7 g/cm$^3$ and has some pores with an average pore size from 2 nm to 10 μm. In some embodiments, the particulate has a physical density higher than 0.8 g/cm$^3$ and a specific surface area greater than 600 m$^2$/g. In some embodiments, the graphene particulate has a physical density higher than 1.0 g/cm$^3$ and a specific surface area greater than 300 m$^2$/g.

The graphene sheets in the ball may comprise a non-pristine graphene material having a content of non-carbon elements in the range from 0.01% to 20% by weight and the non-carbon elements include an element selected from oxygen, fluorine, chlorine, bromine, iodine, nitrogen, hydrogen, or boron.

In certain embodiments, the alkali metal battery comprises a cathode, an anode containing the disclosed combination of multiple graphene balls and Na/Li-attracting metal, an optional lithium source or a sodium source in ionic contact with the anode, and an electrolyte in ionic contact with both the cathode and the anode. The lithium source may be selected from foil, particles, or filaments of lithium metal or lithium alloy having no less than 80% by weight of lithium element in the lithium alloy; or the sodium source is selected from foil, particles, or filaments of sodium metal or sodium alloy having no less than 80% by weight of sodium element in the sodium alloy.

The alkali metal battery may be a lithium metal battery, lithium-sulfur battery, lithium-selenium battery, lithium-air battery, sodium metal battery, sodium-sulfur battery, sodium-selenium battery, or sodium-air battery.

Also provided in the disclosure is a process for producing an anode of combined graphene balls and particles of a Li/Na-attracting metal for an alkali metal battery, the process comprising: (a) providing a slurry comprising a mixture of multiple graphene balls, a lithium-attracting metal or sodium-attracting metal (in the form of a metal coating deposited on graphene ball surfaces or discrete multiple particles), and an optional binder or adhesive dispersed/dissolved in a liquid medium, wherein the lithium-attracting or sodium-attracting metal is selected from Au, Ag, Mg, Zn, Ti, Al, Fe, Mn, Co, Ni, Sn, V, Cr, an alloy thereof, or a combination thereof; and (b) dispensing and depositing the slurry onto a surface of a solid or porous substrate (e.g. Cu foil, Ni foam, or graphene foam as a current collector) and removing the liquid medium to form the anode layer. Preferably, the anode is sodium-free and lithium-free when the battery is made.

In Step (a), graphene balls may be obtained via several procedures. Two examples are given below: (i) B all milling of a mixture containing multiple graphene sheets and optional conducting additive: These graphene sheets can contain pristine graphene, graphene oxide, graphene fluoride, graphene chloride, graphene bromide, graphene iodide, hydrogenated graphene, nitrogenated graphene, chemically functionalized graphene, or a combination thereof. These types of isolated/separated graphene sheets (e.g. individual graphene oxide sheets have been exfoliated and isolated/separated from the precursor graphite oxide materials) can be produced via known processes; (ii) Spray-drying of a suspension containing multiple graphene sheets and other optional ingredients dispersed in a liquid medium (e.g. water or organic solvent).

In the aforementioned (i), the ball milling procedure of combining separated graphene sheets into graphene balls may be preferably conducted by using an energy impacting apparatus selected from a double cone mixer, double cone blender, vibratory ball mill, planetary ball mill, high energy mill, basket mill, agitator ball mill, cryogenic ball mill, micro ball mill, tumbler ball mill, attritor, continuous ball mill, stirred ball mill, pressurized ball mill, plasma-assisted ball mill, freezer mill, vibratory sieve, bead mill, nano bead mill, ultrasonic homogenizer mill, centrifugal planetary mixer, vacuum ball mill, or resonant acoustic mixer. In certain preferred embodiments, the procedure of operating the energy impacting apparatus is conducted in a continuous manner using a continuous energy impacting device. The milling media may be selected from particles of a metal or metal alloy, a glass, a ceramic, a polymer, or a combination thereof.

There is a unique procedure for producing porous graphene balls directly from graphite without going through the production and separation of graphene sheets first. In other words, separated graphene sheets are not present prior to this unique procedure, in contrast to the procedure in the above-described (i). The process comprising: (A) mixing multiple particles of a graphitic material, multiple polymer carrier particles, and an optional ball-milling media to form a mixture in an impacting chamber of an energy impacting apparatus; (B) operating the energy impacting apparatus with a frequency and an intensity for a length of time sufficient for peeling off graphene sheets from particles of the graphitic material and transferring the graphene sheets to surfaces of the polymer carrier particles to produce graphene-embraced polymer particles inside the impacting chamber; (C) recovering the graphene-embraced metal-deposited polymer particles from the impacting chamber; and (D) pyrolyzing the graphene-embraced polymer particles to thermally convert the polymer into pores and carbon or graphite that bonds the graphene sheets to form porous graphene balls, wherein at least a porous graphene ball comprises a graphene/carbon shell encapsulating a porous core and the porous core comprises one or a plurality of pores.

Again, it is important to point out that this unique procedure begins with graphite particles, not previously made isolated/separated graphene sheets. However, the ball milling apparatus can be the same. Thus, the ball milling procedure for concurrent peeling of graphene sheets from graphite particles and re-depositing of peeled-off graphene sheets on carrier particle surfaces may be preferably conducted by using an energy impacting apparatus selected from a double cone mixer, double cone blender, vibratory ball mill, planetary ball mill, high energy mill, basket mill, agitator ball mill, cryogenic ball mill, micro ball mill, tumbler ball mill, attritor, continuous ball mill, stirred ball mill, pressurized ball mill, plasma-assisted ball mill, freezer mill, vibratory sieve, bead mill, nano bead mill, ultrasonic homogenizer mill, centrifugal planetary mixer, vacuum ball mill, or resonant acoustic mixer.

Step (a) of providing the slurry may include a procedure of depositing particles or coating of the lithium-attracting metal or sodium-attracting metal onto external surfaces of the graphene balls prior to mixing with the liquid medium to obtain the slurry.

Decoration or deposition of a Li- or Na-attracting metal onto exterior surfaces of graphene balls may be accomplished via using various depositing or coating means (e.g. melt dipping, solution deposition, chemical vapor deposition, physical vapor deposition, sputtering, electrochemical deposition, etc.).

The desired metal may be directly deposited onto graphene ball surfaces using sputtering or physical vapor deposition, for instance. Alternatively, the metal deposition procedure may include depositing a metal precursor onto graphene ball surfaces and, subsequently, chemically or thermally converting the precursor to the desired metal bonding to graphene surfaces. For instance, graphene ball exterior surfaces may be coated with $HAuCl_4$, which is then thermally converted to Au when the graphene balls are heated. Another example is to deposit zinc chloride on graphene ball surfaces (e.g. via salt solution dipping and drying) and use hydrogen and methane to chemically convert this precursor to Zn metal at a later stage (e.g. prior to dispersing in the liquid medium to form the slurry). There are many well-known metal precursors that can be converted to metals.

The disclosure further provides a process for producing a multiple-layer anode comprising at least a discrete layer of graphene balls and at least a discrete layer of a Li/Na-attracting metal for an alkali metal battery. The process comprises: (a) depositing a layer of a lithium-attracting metal or sodium-attracting metal (in the form of a metal coating or discrete multiple particles) onto a surface of a current collector (e.g. Cu foil, Ni foam, graphene foam, etc.), wherein the lithium-attracting or sodium-attracting metal is selected from Au, Ag, Mg, Zn, Ti, Al, Fe, Mn, Co, Ni, Sn, V, Cr, an alloy thereof, or a combination thereof; and (b) depositing a layer of multiple graphene balls onto a surface (opposite to the current collector) of the metal layer to form the multiple-layer anode (2 layers in this case). It may be noted that a current collector has two primary surfaces and, thus, each of the two primary surfaces may be deposited with such a 2-layer structure. Consequently, the resulting anode has 5 layers.

Alternatively, the layer of multiple graphene balls is deposited onto a surface of the current collector first and subsequently the layer lithium-attracting metal or sodium-attracting metal is deposited onto the graphene ball layer to form a two-layer anode. A third layer (e.g. another layer of graphene balls) may then be deposited onto the metal layer to form a three-layer anode structure. Each of the two primary surfaces of a current collector may be deposited with such a 2-layer or 3-layer structure to form a 5-layer, 6-layer, or 7-layer anode structure, etc.

In the disclosed processes, the discrete layer of lithium-attracting metal or sodium-attracting metal (in the form of a metal coating or thin film) may be deposited with sputtering, physical vapor deposition, etc. The discrete layer of multiple metal particles may be deposited by dispersing multiple particles of the metal and an optional binder or adhesive in a liquid medium to form a slurry and then dispensing and depositing the slurry onto a surface of a current collector or surface of a layer of graphene balls, followed by removing the liquid medium. The dispensing and depositing procedure may comprise a procedure of spraying, coating, printing, casting, etc. The discrete layer of multiple graphene balls may be deposited by dispersing multiple graphene balls and an optional binder or adhesive in a liquid medium to form a slurry and then dispensing and depositing the slurry onto a surface of a current collector or surface of a metal layer, followed by removing the liquid medium. Again, the dispensing and depositing procedure may comprise a procedure of spraying, coating, printing, casting, etc.

The disclosed process may further comprise a step of impregnating or infiltrating lithium metal or sodium metal into the graphene ball layer or the layer of multiple metal particulates, wherein the lithium metal or sodium metal is in physical contact with the lithium-attracting metal or sodium-attracting metal to form lithium-preloaded or sodium-preloaded anode.

The process may further comprise a step of incorporating the anode electrode for a lithium metal battery, lithium-sulfur battery, lithium-selenium battery, lithium-air battery, sodium metal battery, sodium-sulfur battery, sodium-selenium battery, or sodium-air battery.

DESCRIPTION OF THE PREFERRED EMBODIMENTS

Figure 4A:
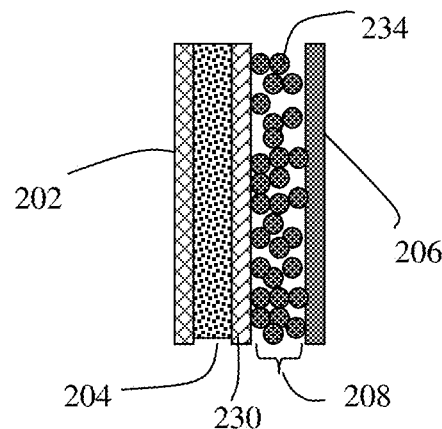
FIG. 4(A) Schematic of a prior art lithium metal battery cell.

As schematically illustrated in FIG. 4(A), a prior art lithium metal cell is typically composed of an anode current collector 202 (e.g. Cu foil 6-12 μm thick), an anode active material layer 204 (e.g. a foil of lithium metal or lithium-rich metal alloy), a porous separator 230, a cathode active material layer 208 (containing a cathode active material, such as $V_2O_5$ and $MoS_2$ particles 234, and conductive additives that are all bonded by a resin binder, not shown), a cathode current collector 206 (e.g. Al foil), and an electrolyte disposed in ionic contact with both the anode active material layer 204 (also simply referred to as the "anode layer") and the cathode active material layer 208 (or simply "cathode layer"). The entire cell is encased in a protective housing, such as a thin plastic-aluminum foil laminate-based envelop. A prior art sodium metal cell is similarly configured, but the anode active material layer is a foil of sodium metal or sodium-rich metal, or particles of sodium.

The prior art lithium or sodium metal cell is typically made by a process that includes the following steps: (a) The first step is mixing and dispersing particles of the cathode active material (e.g. activated carbon), a conductive filler (e.g. acetylene black), a resin binder (e.g. PVDF) in a solvent (e.g. NMP) to form a cathode slurry; (b) The second step includes coating the cathode slurry on the surface(s) of an Al foil and drying the slurry to form a dried cathode electrode coated on the Al foil; (c) The third step includes laminating a Cu foil (as an anode current collector), a sheet of Li or Na foil (or lithium alloy or sodium alloy foil), a porous separator layer, and a cathode electrode-coated Al foil sheet together to form a 5-layer assembly, which is cut and slit into desired sizes and stacked to form a rectangular structure (as an example of shape) or rolled into a cylindrical cell structure; (d) The rectangular or cylindrical laminated structure is then encased in an aluminum-plastic laminated envelope or steel casing; and (e) A liquid electrolyte is then injected into the laminated structure to make a lithium battery cell.

Due to the high specific capacity of lithium metal and sodium metal, the highest battery energy density can be achieved by alkali metal rechargeable batteries that utilize a lithium metal or sodium metal as the anode active material, provided that a solution to the safety problem can be formulated. These cells include (a) the traditional Li or Na metal battery having a Li insertion or Na insertion compound in the cathode, (b) the Li-air or Na—$O_2$ cell that uses oxygen, instead of metal oxide, as a cathode (and Li or sodium metal as an anode instead of graphite or hard carbon particles), (c) the Li-sulfur, Na—S, or other cell using a conversion-type cathode active material, and (d) the lithium-selenium cell or sodium-selenium cell.

The Li—$O_2$ battery is possibly the highest energy density electrochemical cell that can be configured today. The Li—$O_2$ cell has a theoretic energy density of 5,200 Wh/kg when oxygen mass is accounted for. A well configured Li—$O_2$ battery can achieve an energy density of 3,000 Wh/kg, which is 15-20 times greater than those of Li-ion batteries. However, current Li—$O_2$ batteries still suffer from poor energy efficiency, poor cycle efficiency, and dendrite formation issues.

In the Li—S cell, elemental sulfur (S) as a cathode material exhibits a high theoretical Li storage capacity of 1,672 mAh/g. With a Li metal anode, the Li—S battery has a theoretical energy density of ~1,600 Wh/kg (per total weight of active materials). Despite its great potential, the practical realization of the Li—S battery has been hindered by several obstacles, such as low utilization of active material, high internal resistance, self-discharge, and rapid capacity fading on cycling. These technical barriers are due to the poor electrical conductivity of elemental sulfur, the high solubility of lithium polysulfides in organic electrolyte, the formation of inactivated $Li_2S$, the formation of Li dendrites on the anode, and high solid-electrolyte interfacial impedance at the anode. Despite great efforts worldwide, dendrite formation and high interfacial impedance remain the most critical scientific and technological barriers against widespread implementation of all kinds of high energy density batteries having a Li metal anode. The same problems have also prevented commercial application of sodium metal batteries.

We have discovered a highly dendrite-resistant or dendrite-free, graphene ball-based anode configuration for a Li metal cell or Na metal cell that exhibits a high energy, high power density, and stable cycling behavior. In certain embodiments, the disclosure provides an anode for a lithium battery or sodium battery, the anode comprising a combination of multiple porous graphene balls and particles or coating (or thin film) of a lithium-attracting metal or sodium-attracting metal at a graphene ball-to-metal volume ratio from 2/98 to 98/2, wherein the porous graphene ball comprises a plurality of graphene sheets (preferably each having a length or width from 5 nm to 100 μm) forming into the porous graphene ball having a diameter from 100 nm to 20 μm and a pore or multiple pores and wherein particles of the lithium-attracting metal or sodium-attracting metal, having a diameter or thickness from 1 nm to 20 μm, are selected from Au, Ag, Mg, Zn, Ti, Na, K, Al, Fe, Mn, Co, Ni, Sn, V, Cr, an alloy thereof, or a combination thereof. The metal particles or coating are disposed outside of the graphene balls or on exterior surfaces of the graphene balls.

The porous graphene ball (also herein referred to as the porous graphene particulate) can be substantially spherical, ellipsoidal, elongated, or irregular in shape. The porous graphene ball preferably comprises a pore or a plurality of pores having a pore volume fraction from 10% to 99.9% based on the total graphene ball volume.

The lithium- or sodium-attracting metal material can contain a metal (M) selected from Ti, V, Cr, Mn, Fe, Co, Ni, Cu, Zn, Zr, Mo, Pd, Ag, Cd, Au, Pt, W, Al, Sn, In, Pb, Bi, Na, Li, Mg, Ca, an alloy thereof, or a mixture thereof. These elements have the characteristics that (a) the element itself or its alloy with another metal element can alloy with lithium or sodium ions at a temperature from −50° C. to +100° C. (capable of forming $LiM_x$, $NaM_x$, $LiMa_yMb_z$, or $NaMa_y$ $Mb_z$, where x, y, or z is from 0.01 to 6) when these ions return from the cathode during the battery charging operation; or (b) the surfaces of these elements or their alloy with another metal element can be wetted by lithium ions or sodium ions. Most of the transition metals or alkaline metals can be used, but preferably, the metal is selected from Zn, Al, Ag, Au, Ti, Sn, Fe, Mg, Cu, or an alloy thereof with another metal.

The terms "graphene particulates" and "graphene balls" are herein used interchangeably.

Figure 3A:
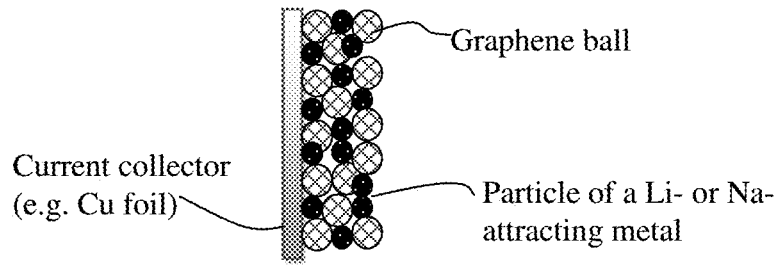
FIG. 3(A) Schematic of an anode according to some embodiments of the present disclosure; the anode active material layer comprising a mixture of multiple graphene balls and particles of a lithium- or sodium-attracting metal supported on a current collector primary surface; the opposing primary surface may also be deposited with such a mixture layer.

FIG. 3(A) schematically shows an anode according to some embodiments of the present disclosure wherein the anode active material layer comprises a mixture of multiple graphene balls and particles of a lithium- or sodium-attracting metal supported on a current collector primary surface. The opposing primary surface of the current collector may also be deposited with such a mixture layer.

Figure 3B:
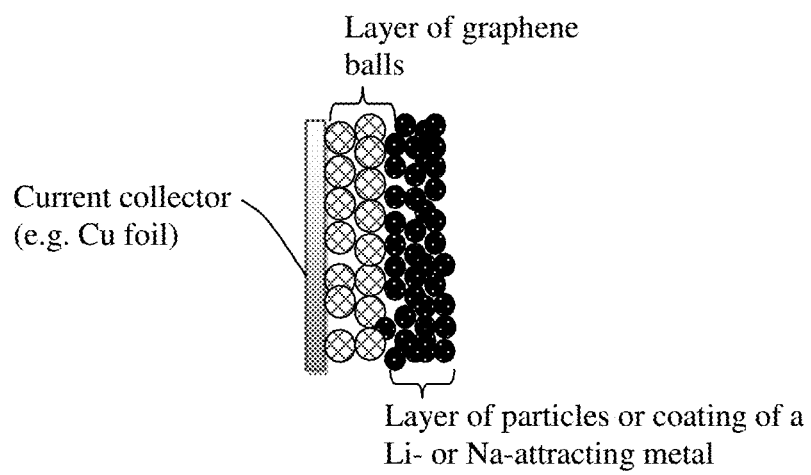
FIG. 3(B) Schematic of an anode according to some embodiments of the present disclosure: the anode active material layer comprising a discrete layer of multiple graphene balls (facing the current collector) and a separate discrete layer of a lithium- or sodium-attracting metal supported on a current collector primary surface; alternatively, the metal layer may be facing the current collector.
Figure 3C:
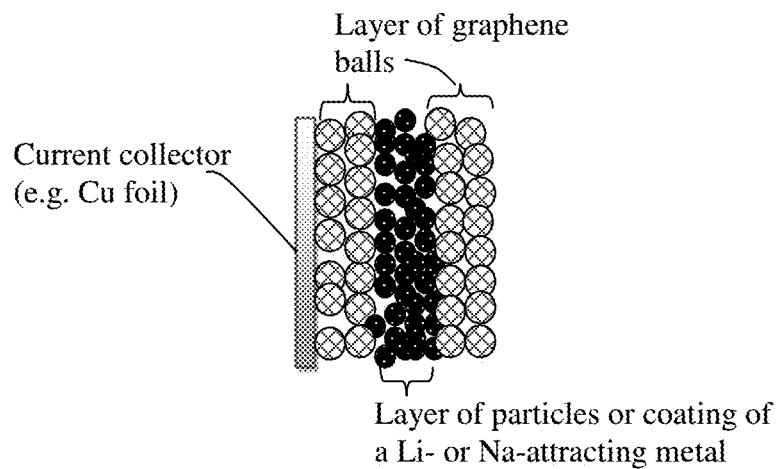
FIG. 3(C) Schematic of an anode according to some embodiments of the present disclosure: the anode active material layer comprising a discrete layer of multiple graphene balls (facing the current collector), a separate discrete layer of a lithium- or sodium-attracting metal, and another graphene ball layers supported on a current collector primary surface; the opposing primary surface may also be deposited with a similar or different multi-layer structure.

Schematically shown in FIG. 3(B) is an anode according to some embodiments of the present disclosure wherein the anode active material layer comprises a discrete layer of multiple graphene balls (facing the current collector in this diagram) and a separate discrete layer of a lithium- or sodium-attracting metal supported on a current collector primary surface. Alternatively, one can build a similar structure wherein the metal layer faces the current collector;

FIG. 3(C) schematically shows yet another anode according to some embodiments of the present disclosure: the anode active material layer comprising a discrete layer of multiple graphene balls (facing the current collector), a separate discrete layer of a lithium- or sodium-attracting metal, and another graphene ball layer supported on a current collector primary surface. The opposing primary surface of the current collector may also be deposited with a similar or different multi-layer structure.

Figure 3D:
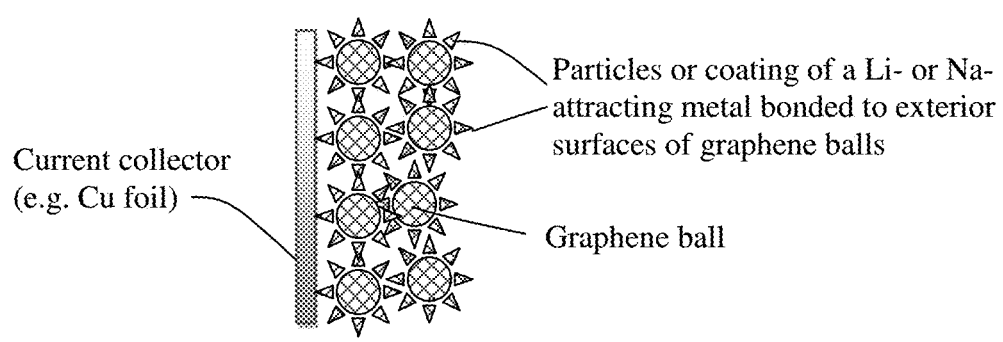
FIG. 3(D) Schematic of an anode according to some embodiments of the present disclosure; the anode active material layer (comprising multiple graphene balls each decorated with particles or coating of a lithium- or sodium-attracting metal) supported on a current collector primary surface; the opposing primary surface may also be deposited with such a mixture layer.

FIG. 3(D) schematically illustrates an anode according to some embodiments of the present disclosure: the anode active material layer (comprising multiple graphene balls each decorated with particles or coating of a lithium- or sodium-attracting metal) supported on a current collector primary surface. Again, the opposing primary surface of the current collector may also be deposited with such a mixture layer.

Figure 4B:
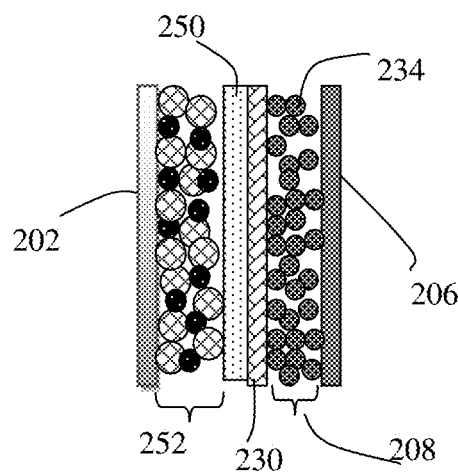
FIG. 4(B) Schematic of a lithium metal or sodium metal battery cell according to some embodiments of the present disclosure, wherein the anode comprises a layer 252 of a mixture of multiple graphene balls and particles of a lithium- or sodium-attracting metal and a layer of Li or Na film 250 (foil or coating, as a Li or Na ion source). This layer of Li or Na film preferably is totally ionized during the first discharge of the battery.

Schematically shown in FIG. 4(B) is a lithium metal or sodium metal battery cell according to some embodiments of the present disclosure, wherein the anode comprises a layer 252 of a mixture of multiple graphene balls and particles of a Li ion- or Na ion-attracting metal and a layer of Li or Na film 250 (foil or coating, as a Li or Na ion source). This layer of Li or Na film preferably is totally ionized during the first discharge of the battery. Other components of this battery cell can be similar to those of the conventional lithium or sodium battery.

Figure 4C:
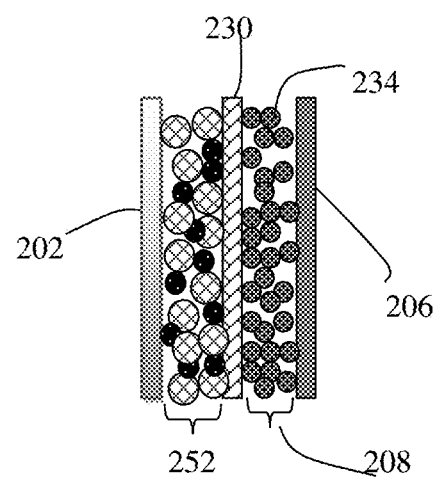
FIG. 4(C) Schematic of a lithium metal or sodium metal battery cell according to some embodiments of the present disclosure, wherein the anode comprises a layer 252 of a mixture of multiple graphene balls and particles of a lithium- or sodium-attracting metal (but no Li or Na film). The cathode active materials 234 contain the required Li or Na ions when the battery cell is made.

FIG. 4(C) schematically shows another lithium metal or sodium metal battery cell according to some embodiments of the present disclosure, wherein the anode comprises a layer 252 of multiple graphene balls and ion-attracting metal particles, but no Li or Na film (no extra Li or Na ion source). Instead, the cathode active materials 234 contain the required Li or Na ions when the battery cell is made. This configuration has the advantage that the anode initially contains no lithium or sodium metal film (foil or coating) that is otherwise highly sensitive to moisture and oxygen in the room air and difficult and expensive to handle in a real manufacturing environment.

The graphene balls or the mixture layer may be lithiated (loaded with Li) or sodiated (loaded with Na) before or after the cell is made. For instance, when the cell is made, a foil or particles of lithium or sodium metal (or metal alloy) may be implemented at the anode (e.g. between a layer of multiple graphene balls/metal particles and a porous separator or solid electrolyte), as illustrated in FIG. 4(B), to supply this mixture layer of graphene balls/metal particles with lithium or sodium. This lithiation or sodiation procedure can occur when the lithium or sodium foil layer is in close contact with the layer of graphene particulates and a liquid electrolyte is introduced into the anode or the entire cell.

Additionally, during the first battery discharge cycle, lithium (or sodium) is ionized, supplying lithium (or sodium) ions ($Li^+$ or $Na^+$) into electrolyte. These $Li^+$ or $Na^+$ ions migrate to the cathode side and get captured by and stored in the cathode active material (e.g. vanadium oxide, $MoS_2$, S, etc.). During the subsequent re-charge cycle of the battery, $Li^+$ or $Na^+$ ions are released by the cathode active material and migrate back to the anode. These $Li^+$ or $Na^+$ ions naturally diffuse into the graphene balls to reach the lithium- or sodium-attracting metal lodged inside the graphene particulates. In this manner, the particulates are said to be lithiated or sodiated.

Graphene is a single-atom thick layer of $sp^2$ carbon atoms arranged in a honeycomb-like lattice. Graphene can be readily prepared from graphite, activated carbon, graphite fibers, carbon black, and meso-phase carbon beads. Single-layer graphene and its slightly oxidized version (GO) can have a specific surface area (SSA) as high as 2630 $m^2/g$. It is this high surface area that dramatically reduces the effective electrode current density, which in turn significantly reduces or eliminates the possibility of Li dendrite formation.

However, we have unexpectedly observed that it is difficult for the returning lithium ions or sodium ions (those that return from the cathode back to the anode during battery charge) to uniformly deposit to the underlying Cu foil (current collector) without the presence of a lithium- or sodium-attracting metal and graphene balls. Lithium or sodium has a high tendency to not adhere well to the current collector, thereby becoming isolated lithium or sodium clusters that no longer participate in reversible lithium/sodium storage. We have further surprisingly observed that such a lithium- or sodium-attracting metal, if present on the exterior surfaces of graphene balls, provides a safe and reliable site to receive and accommodate lithium/sodium during the battery charging step. The resulting lithium alloy or sodium alloy is also capable of reversibly releasing lithium or sodium ions into electrolyte that travel to the cathode side during the subsequent battery discharging step.

Carbon is known to have five unique crystalline structures, including diamond, fullerene (0-D nano graphitic material), carbon nano-tube or carbon nano-fiber (1-D nano graphitic material), graphene (2-D nano graphitic material), and graphite (3-D graphitic material). The carbon nano-tube (CNT) refers to a tubular structure grown with a single wall or multi-wall. Carbon nano-tubes (CNTs) and carbon nano-fibers (CNFs) have a diameter on the order of a few nanometers to a few hundred nanometers. Their longitudinal, hollow structures impart unique mechanical, electrical and chemical properties to the material. The CNT or CNF is a one-dimensional nano carbon or 1-D nano graphite material.

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Pat. Pub. No. 2005/0271574) (now abandoned); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Pat. Pub. No. 2008/0048152) (now abandoned).

Our research group also presented the first review article on various processes for producing NGPs and NGP nanocomposites [Bor Z. Jang and A Zhamu, "Processing of Nano Graphene Platelets (NGPs) and NGP Nanocomposites: A Review," J. Materials Sci. 43 (2008) 5092-5101]. Four main prior-art approaches have been followed to produce NGPs. The most commonly used process is chemical oxidation and reduction of graphite to produce graphene oxide (GO) and reduced graphene oxide (RGO).

Figure 1:
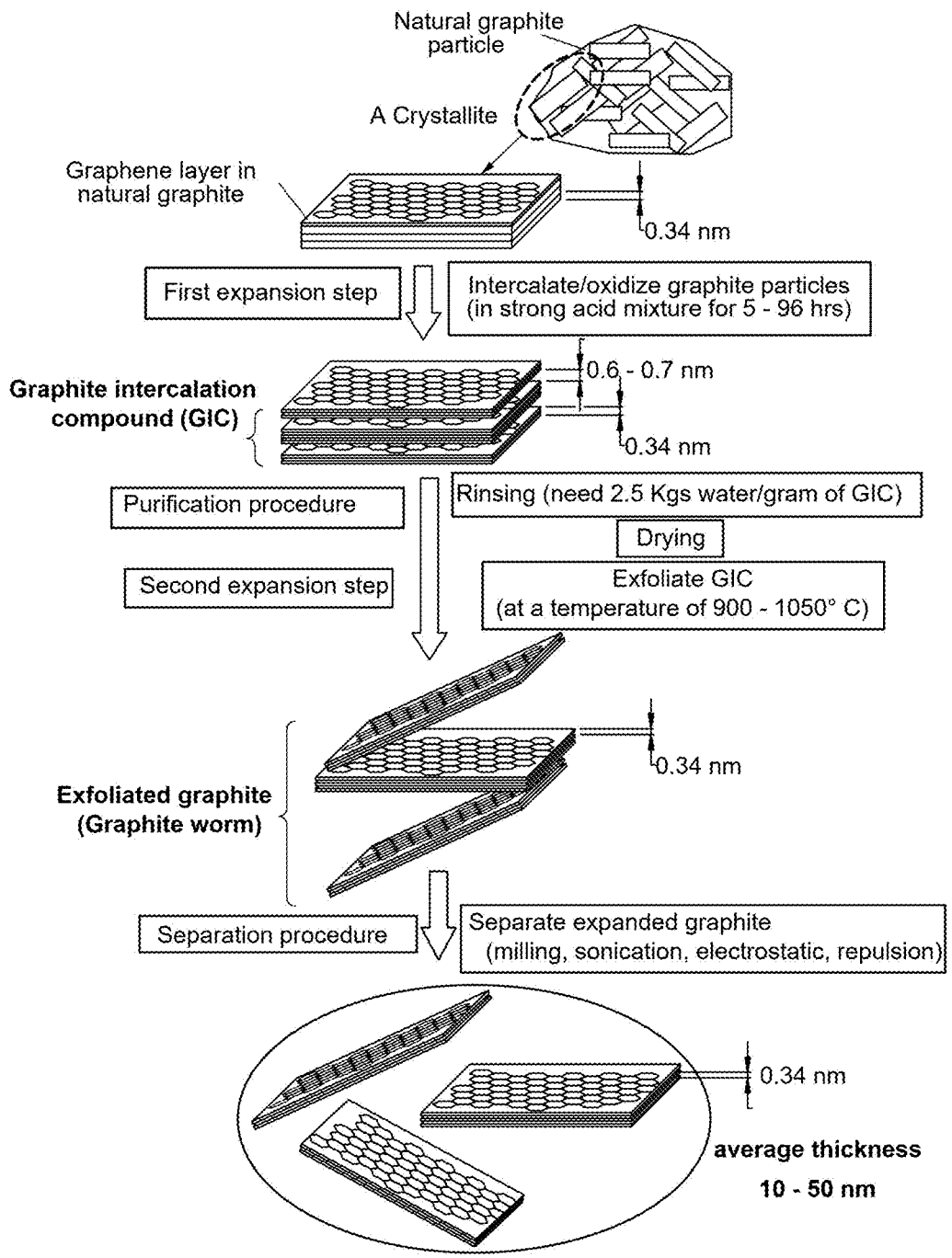
FIG. 1 A flow chart showing the most commonly used prior art process for producing highly oxidized graphene sheets that entails chemical oxidation/intercalation, rinsing, and high-temperature exfoliation procedures.

This process, as schematically illustrated in FIG. 1, entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d=½ d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded but un-exfoliated or exfoliated GO powder is dispersed in water or aqueous alcohol solution, which is subjected to ultrasonication. It is important to note that in these processes, ultrasonification is used after intercalation and oxidation of graphite (i.e., after first expansion) and can be after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

In the aforementioned examples, the starting material for the preparation of graphene sheets or NGPs is a graphitic material that may be selected from the group consisting of natural graphite, artificial graphite, graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 4 hours to 5 days). The resulting graphite oxide particles are then rinsed with water several times to adjust the pH values to typically 2-5. The resulting suspension of graphite oxide particles dispersed in water is then subjected to ultrasonication to produce a dispersion of separate graphene oxide sheets dispersed in water. A small amount of reducing agent (e.g. $Na_4B$) may be added to obtain reduced graphene oxide (RGO) sheets.

In order to reduce the time required to produce a precursor solution or suspension, one may choose to oxidize the graphite to some extent for a shorter period of time (e.g., 30 minutes-4 hours) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. Either the already separated graphene sheets (after mechanical shearing) or the un-broken graphite worms or individual graphite flakes are then re-dispersed in water, acid, or organic solvent and ultrasonicated to obtain a graphene dispersion.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication to obtain a graphene dispersion.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature $T>31°$ C. and pressure $P>7.4$ MPa) and water (e.g., at $T>374°$ C. and $P>22.1$ MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce a graphene dispersion of separated graphene sheets (non-oxidized NGPs) dispersed in a liquid medium (e.g. water, alcohol, or organic solvent).

Graphene materials can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS). When the oxygen content of graphene oxide exceeds 30% by weight (more typically when >35%), the GO molecules dispersed or dissolved in water for a GO gel state.

The laminar graphite materials used in the prior art processes for the production of the GIC, graphite oxide, and subsequently made exfoliated graphite, flexible graphite sheets, and graphene platelets were, in most cases, natural graphite. However, the present disclosure is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual single graphene layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium to produce graphene fluoride sheets dispersed in the liquid medium. The resulting dispersion can be directly used in the graphene deposition of polymer component surfaces.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

For the purpose of defining the claims of the instant application, NGPs or graphene materials include discrete sheets/platelets of single-layer and multi-layer (typically less than 10 layers, the few-layer graphene) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently invented graphene can contain pristine or non-pristine graphene and the invented method allows for this flexibility. These graphene sheets all can be chemically functionalized.

Figure 2A:
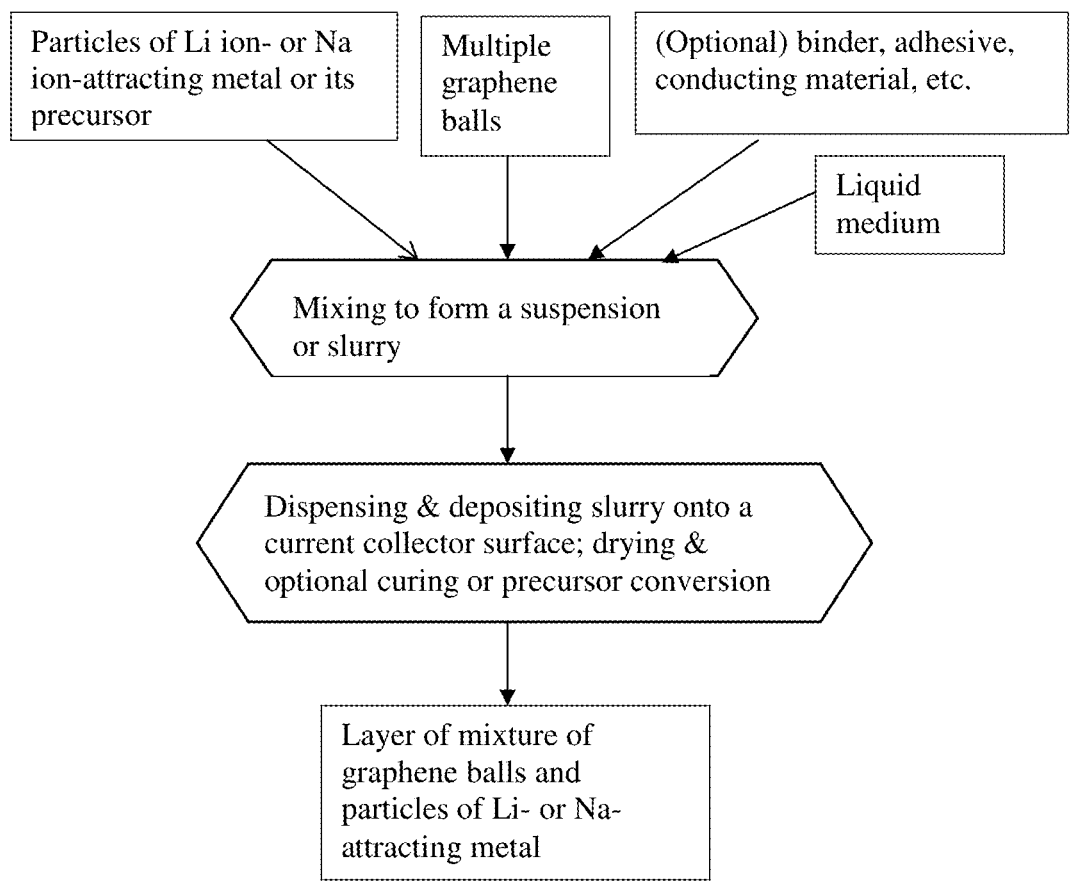
FIG. 2(A) A flow chart showing a presently disclosed process for producing an anode comprising a layer of mixture of graphene balls and multiple particles of a lithium- or sodium metal-attracting metal supported on a current collector surface.

As illustrated in FIG. 2(A), the anode of combined graphene balls/ion-attracting metal for an alkali metal battery may be produced by a process comprising: (a) providing a slurry comprising a mixture of multiple graphene balls, a lithium-attracting metal or sodium-attracting metal (in the form of a metal coating deposited on graphene ball surfaces or discrete multiple particles), and an optional binder or adhesive dispersed/dissolved in a liquid medium, wherein the lithium-attracting or sodium-attracting metal is selected from Au, Ag, Mg, Zn, Ti, Al, Fe, Mn, Co, Ni, Sn, V, Cr, an alloy thereof, or a combination thereof; and (b) dispensing and depositing the slurry onto a surface of a solid or porous substrate (e.g. Cu foil, Ni foam, or graphene foam as a current collector) and removing the liquid medium to form the anode layer.

In Step (a), graphene balls may be obtained via several procedures. Two examples are given below: (i) Ball milling of a mixture containing multiple graphene sheets and optional conducting additive: These graphene sheets can contain pristine graphene, graphene oxide, graphene fluoride, graphene chloride, graphene bromide, graphene iodide, hydrogenated graphene, nitrogenated graphene, chemically functionalized graphene, or a combination thereof. These types of isolated/separated graphene sheets (e.g. individual graphene oxide sheets have been exfoliated and isolated/separated from the precursor graphite oxide materials) can be produced via known processes; (ii) Spray-drying of a suspension containing multiple graphene sheets and other optional ingredients dispersed in a liquid medium (e.g. water or organic solvent).

In the aforementioned (i), the ball milling procedure of combining previously made separated graphene sheets into graphene balls may be preferably conducted by using an energy impacting apparatus selected from a double cone mixer, double cone blender, vibratory ball mill, planetary ball mill, high energy mill, basket mill, agitator ball mill, cryogenic ball mill, micro ball mill, tumbler ball mill, attritor, continuous ball mill, stirred ball mill, pressurized ball mill, plasma-assisted ball mill, freezer mill, vibratory sieve, bead mill, nano bead mill, ultrasonic homogenizer mill, centrifugal planetary mixer, vacuum ball mill, or resonant acoustic mixer. In certain preferred embodiments, the procedure of operating the energy impacting apparatus is conducted in a continuous manner using a continuous energy impacting device. The milling media may be selected from particles of a metal or metal alloy, a glass, a ceramic, a polymer, or a combination thereof.

There is a unique procedure for producing porous graphene balls directly from graphite without going through the production and separation of graphene sheets first. In other words, separated graphene sheets are not present prior to this unique procedure, in contrast to the procedure in the above-described (i). The process comprising: (A) mixing multiple particles of a graphitic material, multiple polymer carrier particles, and an optional ball-milling media to form a mixture in an impacting chamber of an energy impacting apparatus; (B) operating the energy impacting apparatus with a frequency and an intensity for a length of time sufficient for peeling off graphene sheets from particles of the graphitic material and transferring the graphene sheets to surfaces of the polymer carrier particles to produce graphene-embraced polymer particles inside the impacting chamber; (C) recovering the graphene-embraced metal-deposited polymer particles from the impacting chamber; and (D) pyrolyzing the graphene-embraced polymer particles to thermally convert the polymer into pores and carbon or graphite that bonds the graphene sheets to form porous graphene balls, wherein at least a porous graphene ball comprises a graphene/carbon shell encapsulating a porous core and the porous core comprises one or a plurality of pores.

Again, it is important to point out that this unique procedure begins with graphite particles, not previously made isolated/separated graphene sheets. However, the ball milling apparatus can be the same. Thus, the ball milling procedure for concurrent peeling of graphene sheets from graphite particles and re-depositing of peeled-off graphene sheets on carrier particle surfaces may be preferably conducted by using an energy impacting apparatus selected from a double cone mixer, double cone blender, vibratory ball mill, planetary ball mill, high energy mill, basket mill, agitator ball mill, cryogenic ball mill, micro ball mill, tumbler ball mill, attritor, continuous ball mill, stirred ball mill, pressurized ball mill, plasma-assisted ball mill, freezer mill, vibratory sieve, bead mill, nano bead mill, ultrasonic homogenizer mill, centrifugal planetary mixer, vacuum ball mill, or resonant acoustic mixer.

Step (a) of providing the slurry may include a procedure of depositing particles or coating of the lithium-attracting metal or sodium-attracting metal onto external surfaces of the graphene balls prior to mixing with the liquid medium to obtain the slurry.

Decoration or deposition of a Li- or Na-attracting metal onto exterior surfaces of graphene balls may be accomplished via using various depositing or coating means (e.g. melt dipping, solution deposition, chemical vapor deposition, physical vapor deposition, sputtering, electrochemical deposition, etc.).

The desired metal may be directly deposited onto graphene ball surfaces using sputtering or physical vapor deposition, for instance. Alternatively, the metal deposition procedure may include depositing a metal precursor onto graphene ball surfaces and, subsequently, chemically or thermally converting the precursor to the desired metal bonding to graphene surfaces. For instance, graphene ball exterior surfaces may be coated with $HAuCl_4$, which is then thermally converted to Au when the graphene balls are heated. Another example is to deposit zinc chloride on graphene ball surfaces (e.g. via salt solution dipping and drying) and use hydrogen and methane to chemically convert this precursor to Zn metal at a later stage (e.g. prior to dispersing in the liquid medium to form the slurry). There are many well-known metal precursors that can be converted to metals.

Figure 2B:
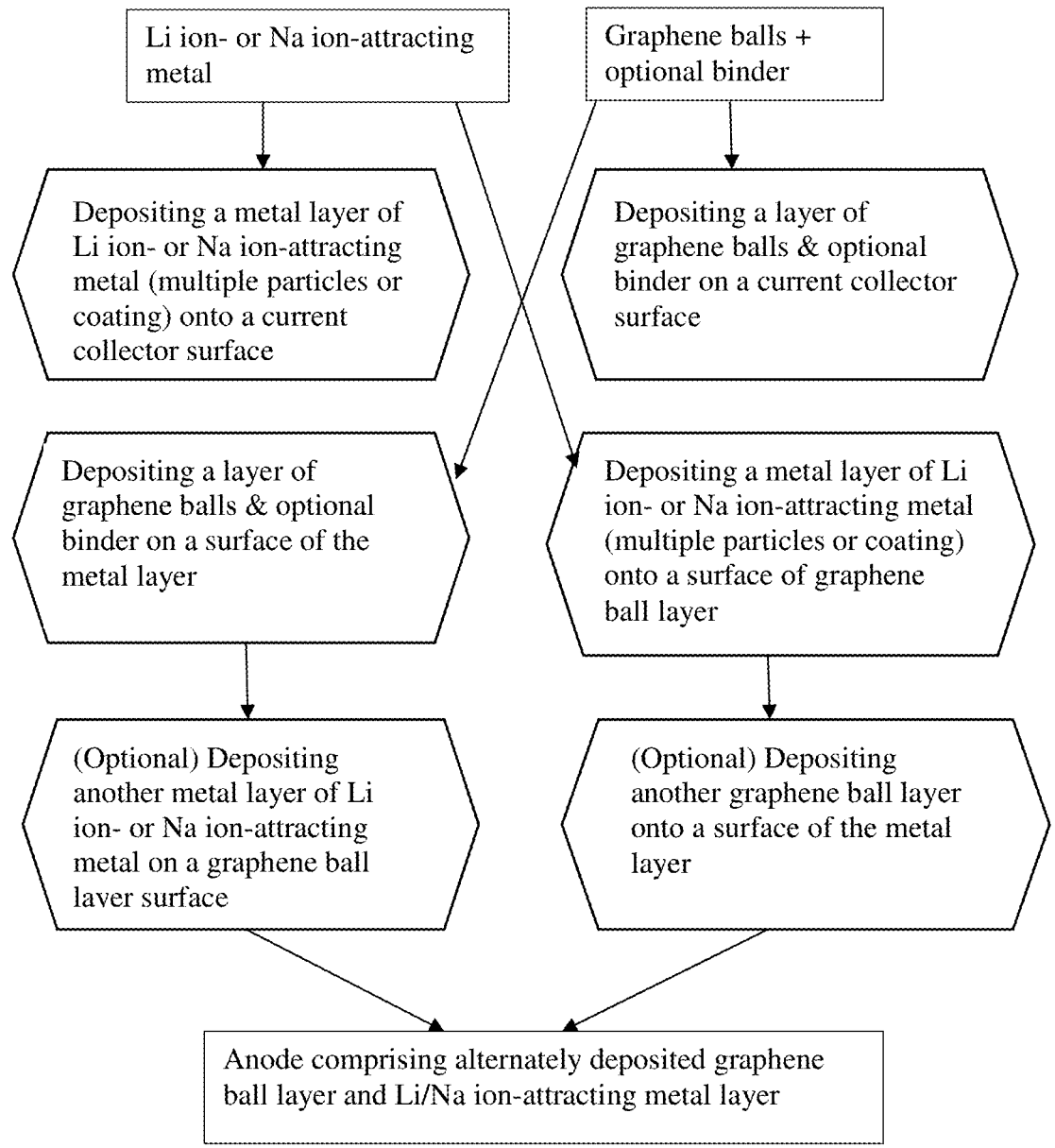
FIG. 2(B) Another flow chart showing a presently invented process for producing an anode comprising at least a layer of graphene balls and at least a layer of particles or coating of a lithium- or sodium metal-attracting metal supported on a current collector surface.

The disclosure further provides a process for producing a multiple-layer anode comprising at least a discrete layer of graphene balls and at least a discrete layer of a Li/Na-attracting metal for an alkali metal battery, as illustrated in FIG. 3(B) and FIG. 3(D). The process (e.g. as illustrated in FIG. 2(B) as an example) comprises: (a) depositing a layer of a lithium-attracting metal or sodium-attracting metal (in the form of a metal coating or discrete multiple particles) onto a surface of a current collector (e.g. Cu foil, Ni foam, graphene foam, etc.), wherein the lithium-attracting or sodium-attracting metal is selected from Au, Ag, Mg, Zn, Ti, Al, Fe, Mn, Co, Ni, Sn, V, Cr, an alloy thereof, or a combination thereof; and (b) depositing a layer of multiple graphene balls onto a surface (opposite to the current collector) of the metal layer to form the multiple-layer anode (2 layers in this case). It may be noted that a current collector has two primary surfaces and, thus, each of the two primary surfaces may be deposited with such a 2-layer structure. Consequently, the resulting anode has 5 layers.

Alternatively, the layer of multiple graphene balls is deposited onto a surface of the current collector first and subsequently the layer lithium-attracting metal or sodium-attracting metal is deposited onto the graphene ball layer to form a two-layer anode. A third layer (e.g. another layer of graphene balls) may then be deposited onto the metal layer to form a three-layer anode structure. Each of the two primary surfaces of a current collector may be deposited with such a 2-layer or 3-layer structure to form a 5-layer, 6-layer, or 7-layer anode structure, etc.

In the disclosed processes, the discrete layer of lithium-attracting metal or sodium-attracting metal (in the form of a metal coating or thin film) may be deposited with sputtering, physical vapor deposition, etc. The discrete layer of multiple metal particles may be deposited by dispersing multiple particles of the metal and an optional binder or adhesive in a liquid medium to form a slurry and then dispensing and depositing the slurry onto a surface of a current collector or surface of a layer of graphene balls, followed by removing the liquid medium. The dispensing and depositing procedure may comprise a procedure of spraying, coating, printing, casting, etc. The discrete layer of multiple graphene balls may be deposited by dispersing multiple graphene balls and an optional binder or adhesive in a liquid medium to form a slurry and then dispensing and depositing the slurry onto a surface of a current collector or surface of a metal layer, followed by removing the liquid medium. Again, the dispensing and depositing procedure may comprise a procedure of spraying, coating, printing, casting, etc.

The disclosed process may further comprise a step of impregnating or infiltrating lithium metal or sodium metal into the graphene ball layer or the layer of multiple metal particulates, wherein the lithium metal or sodium metal is in physical contact with the lithium-attracting metal or sodium-attracting metal to form lithium-preloaded or sodium-preloaded anode.

The process may further comprise a step of incorporating the anode electrode for a lithium metal battery, lithium-sulfur battery, lithium-selenium battery, lithium-air battery, sodium metal battery, sodium-sulfur battery, sodium-selenium battery, or sodium-air battery.

There are three broad categories of methods that can be implemented to produce graphene balls (with or without other ingredients in the balls, or with or without a binder or adhesive). These include physical methods, physico-chemical methods, and chemical methods. The physical methods include pan-coating, air-suspension coating, centrifugal extrusion, vibration nozzle coating, and spray-drying methods. The physico-chemical methods include ionotropic gelation and coacervation-phase separation methods. The chemical methods include interfacial polycondensation, interfacial cross-linking, in-situ polymerization, and matrix polymerization. Several preferred processes are briefly discussed below:

Pan-coating method: The pan coating process involves tumbling a mixture of graphene sheets and an optional conductive additive in a pan or a similar device while a bonding material or adhesive (e.g. a curable monomer/oligomer, polymer melt, polymer/solvent solution) is applied slowly until a desired powder mass of graphene balls is attained.

Air-suspension coating method: In the air suspension coating process, a mixture of graphene sheets, an optional adhesive, and an optional conductive additive is dispersed into the supporting air stream in an encapsulating chamber. A controlled stream of a suspension comprising graphene sheets dispersed in a polymer-solvent solution (e.g. polymer or its monomer or oligomer dissolved in a solvent; or its monomer or oligomer alone in a liquid state) is concurrently introduced into this chamber, allowing the solution to hit and coat the suspended mixture particles. These suspended particles are coated with polymer/graphene sheets while the volatile solvent is removed, producing balls of polymer-bonded graphene sheets.

Vibrational nozzle encapsulation method: Graphene balls containing graphene sheets and optional conducting additive can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the metal particles and graphene sheets dispersed in a liquid medium.

Spray-drying: Spray drying may be used to combine graphene sheets and other ingredients into graphene balls from a suspension comprising multiple graphene sheets and desired ingredients suspended in a liquid medium or a polymer solution. In spray drying, the liquid feed (solution or suspension) is atomized to form droplets which, upon contacts with hot gas, allow solvent to get vaporized and graphene sheets and other solid species naturally self-assemble into graphene balls.

The process may further comprise a step of adding 0.01% to 40% by weight of a binder, adhesive, or matrix material to help hold the multiple graphene sheets in the graphene ball together as a composite ball. This may be accomplished for example by including the adhesive/binder/matrix material in the suspension prior to the graphene ball forming procedure, or by spraying a binder or matrix material onto the surfaces of graphene balls after formation. The binder, adhesive, or matrix material may comprise an electron-conducting or lithium ion-conducting material. The electron-conducting material may be selected from an intrinsically conducting polymer, a pitch, a metal, a combination thereof, or a combination thereof with carbon, wherein this metal does not include Au, Ag, Mg, Zn, Ti, Li, Na, K, Al, Fe, Mn, Co, Ni, Sn, V, Cr, or an alloy thereof. The intrinsically conducting polymer is selected from polyaniline, polypyrrole, polythiophene, polyfuran, polyacetylene, a bi-cyclic polymer, a sulfonated derivative thereof, or a combination thereof.

The graphene balls may comprise therein a lithium ion- or sodium ion-conducting material selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

The lithium ion-conducting material may contain a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof. These salts can also be used as a lithium salt of an electrolyte for a lithium battery.

Alternatively or additionally, the lithium ion-conducting material may comprise a lithium ion-conducting polymer selected from polydially dimethyl-ammonium chloride (PDDA), polysodium 4-styrenesulfonate (PSS), polyethylene glycol tert-octylphenylether (PEGPE), polyallyl amine (PAAm), poly(ethylene oxide) (PEO), Polypropylene oxide (PPO), poly(acrylonitrile) (PAN), poly(methyl methacrylate) (PMMA), poly(vinylidene fluoride) (PVdF), Poly bismethoxy ethoxyethoxide-phosphazenex, Polyvinyl chloride, Polydimethylsiloxane, poly(vinylidene fluoride)-hexafluoropropylene (PVDF-HFP), a sulfonated derivative thereof, or a combination thereof. These materials may be added into the suspension prior to graphene ball formation.

In certain embodiments, the graphene balls comprise therein an electron-conducting material selected from an expanded graphite flake, carbon nanotube, carbon nanofiber, carbon fiber, carbon particle, graphite particle, carbon black, acetylene black, pitch, an electron-conducting polymer, or a combination thereof. The electron-conducting polymer is preferably selected from polyaniline, polypyrrole, polythiophene, polyfuran, polyacetylene, a bi-cyclic polymer, a sulfonated derivative thereof, or a combination thereof. These materials may be added into the suspension prior to graphene ball formation.

The process may further comprise a step of combining a plurality of presently disclosed graphene balls and particles (or coating) of a Li ion- or Na ion-attracting metal together to form an anode electrode. The process may further comprise a step of combining a cathode, the disclosed anode electrode, an optional lithium source or a sodium source in ionic contact with said anode electrode, and an electrolyte in ionic contact with both the cathode and the anode electrode to form an alkali metal battery cell. The lithium source is selected from foil, particles, or filaments of lithium metal or lithium alloy having no less than 80% by weight of lithium element in the lithium alloy; or wherein the sodium source is selected from foil, particles, or filaments of sodium metal or sodium alloy having no less than 80% by weight of sodium element in the sodium alloy. The lithium ion or sodium ion source may not be required if the cathode active material has some built-in lithium or sodium atoms (e.g. lithium transition metal oxide, NMC, NCA, etc.) that can be released during the battery charge procedure.

The graphene balls may contain single-layer or few-layer graphene sheets in the encapsulating shell, wherein the few-layer graphene sheets have 2-10 layers of stacked graphene planes having an inter-plane spacing $d_{002}$ from 0.3354 nm to 0.36 nm as measured by X-ray diffraction and the single-layer or few-layer graphene sheets contain a pristine graphene material having essentially zero % of non-carbon elements, or a non-pristine graphene material having 0.01% to 25% by weight of non-carbon elements (more typically <15%) wherein the non-pristine graphene is selected from graphene oxide, reduced graphene oxide, graphene fluoride, graphene chloride, graphene bromide, graphene iodide, hydrogenated graphene, nitrogenated graphene, chemically functionalized graphene, or a combination thereof.

The graphene balls typically have a density from 0.001 to 1.7 $g/cm^3$, a specific surface area from 50 to 2,630 $m^2/g$. In a preferred embodiment, the graphene sheets contain stacked graphene planes having an inter-planar spacing $d_{002}$ from 0.3354 nm to 0.40 nm as measured by X-ray diffraction.

The gaps between the free ends of the graphene sheets may be advantageously bonded by an intrinsically conducting polymer, a pitch, a metal, etc. Due to these unique chemical composition (including oxygen or fluorine content, etc.), morphology, crystal structure (including inter-graphene spacing), and structural features (e.g. degree of orientations, few defects, chemical bonding and no gap between graphene sheets, and substantially no interruptions along graphene plane directions), the graphene particulates have a unique combination of outstanding thermal conductivity, electrical conductivity, mechanical strength, and elasticity.

The aforementioned features and characteristics make a mixture of graphene balls and ion-attracting metal an ideal battery anode active material for the following reasons.

1) Graphene sheets in the graphene balls bridged with a conducting material provide a network of electron-conducting pathways without interruption, allowing for low resistance to electron transport and enabling the option of reducing or eliminating the addition of an electron conductivity additive in the anode.
2) The lithium- or sodium-attracting metal in the form of multiple particles or coating in contact with exterior surfaces of graphene balls enable the stable and safe storage of lithium or sodium metal that comes back from the cathode side during a recharge operation of the battery.
3) The high specific surface areas of graphene balls appear to impart dendrite formation resistance to the anode likely due to the significantly reduced electrode exchange current density.
4) The high elasticity of graphene balls (capable of deforming to a great extent when stressed and quickly recovering their original shape when the stress is relieved) enables the anode of the resulting cell to maintain the electrode dimension (e.g. without electrode thickness increase or decrease) during the battery charge or discharge. This feature is essential to maintaining structural integrity of the battery cell.

Thus, the presently invented electrodes exhibit a host of many totally unexpected advantages over the conventional lithium or sodium metal battery cell electrodes.

Electrolyte is an important ingredient in a battery. A wide range of electrolytes can be used for practicing the instant disclosure. Most preferred are non-aqueous liquid, polymer gel, and solid-state electrolytes although other types can be used. Polymer, polymer gel, and solid-state electrolytes are preferred over liquid electrolyte.

The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) effective in suppressing the reductive or oxidative decomposition of electrolyte; and (b) high in conductivity. A non-aqueous electrolyte solely composed of ethylene carbonate (EC) is advantageous in that it is relatively stable against carbonaceous filament materials. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 3.5 mol/l.

For sodium metal batteries, the organic electrolyte may contain an alkali metal salt preferably selected from sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), bis-trifluoromethyl sulfonylimide potassium ($KN(CF_3SO_2)_2$), an ionic liquid salt, or a combination thereof.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a battery.

The cathode active material may be selected from a wide variety of oxides, such as lithium-containing nickel oxide, cobalt oxide, nickel-cobalt oxide, vanadium oxide, and lithium iron phosphate. These oxides may contain a dopant, which is typically a metal element or several metal elements. The cathode active material may also be selected from chalcogen compounds, such as titanium disulfate, molybdenum disulfate, and metal sulfides. More preferred are lithium cobalt oxide (e.g., $Li_xCoO_2$ where $0.8 \leq x \leq 1$), lithium nickel oxide (e.g., $LiNiO_2$), lithium manganese oxide (e.g., $LiMn_2O_4$ and $LiMnO_2$), lithium transition metal oxides (e.g. NCM, NCA, etc.), lithium iron phosphate, lithium manganese-iron phosphate, lithium vanadium phosphate, and the like. Sulfur or lithium polysulfide may also be used in a Li—S cell.

The rechargeable lithium metal batteries can make use of non-lithiated compounds, such as $TiS_2$, $MoS_2$, $MnO_2$, $CoO_2$, $V_3O_8$, and $V_2O_5$, as the cathode active materials. The lithium vanadium oxide may be selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x < 5$. In general, the inorganic material-based cathode materials may be selected from a metal carbide, metal nitride, metal boride, metal dichalcogenide, or a combination thereof. Preferably, the desired metal oxide or inorganic material is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form. These materials can be in the form of a simple mixture with sheets of a graphene material, but preferably in a nano particle or nano coating form that that is physically or chemically bonded to a surface of the graphene sheets.

Preferably, the cathode active material for a sodium metal battery contains a sodium intercalation compound or a potassium intercalation compound selected from $NaFePO_4$, $KFePO_4$, $Na_{(1-x)}K_xPO_4$, $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $KVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$, $Na_{2/3}[Ni_{1/3}Mn_{2/3}]O_2$, $Na_x(Fe_{1/2}Mn_{1/2})O_2$, $Na_xMnO_2$, $Na_xK_{(1-x)}MnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{1/3}O_2$, $Cu_{0.56}Ni_{0.44}HCF$, NiHCF, $Na_xMnO_2$, $NaCrO_2$, $KCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$ (y/z=0.01 to 100), Se, Alluaudites, or a combination thereof, wherein x is from 0.1 to 1.0.

The organic material or polymeric material-based cathode materials may be selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7, 10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT (CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, Li$_4$C$_6$O$_6$, Li$_2$C$_6$O$_6$, Li$_6$C$_6$O$_6$, Na$_x$C$_6$O$_6$ (x=1-3), Na$_2$(C$_6$H$_2$O$_4$), Na$_2$C$_8$H$_4$O$_4$ (Na terephthalate), Na$_2$C$_6$H$_4$O$_4$(Na trans-trans-muconate), or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio) benzene] (PTKPTB, or poly[3,4(ethylenedithio)thiophene] (PEDTT).

The organic material that can be used as a cathode active material in a lithium metal battery or sodium metal battery may include a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The following examples are used to illustrate some specific details about the best modes of practicing the instant disclosure and should not be construed as limiting the scope of the disclosure.

Example 1: Production of Graphene Balls (Graphene Particulates) from Chemically Oxidized Flake Graphite Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions. The suspensions were then spry-dried to obtain graphene balls.

Figure 5:
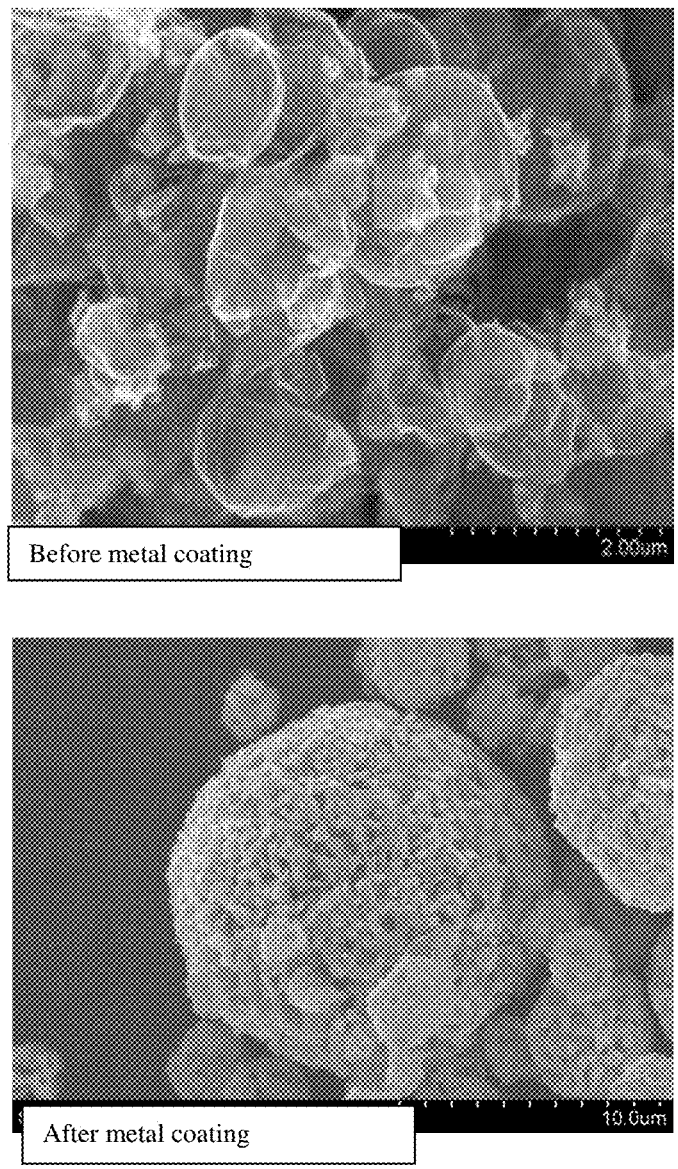
FIG. 5 SEM images of graphene balls before and after metal coating.

For deposition of higher melting point metals (e.g. Au, Ag, Ni, Co, Mn, Fe, and Ti) as a lithium- or sodium-attracting metal on exterior surfaces of graphene balls, controlled amounts of a precursor material (e.g. HAuCl$_4$, silver nitrate, or nickel acetate), polyvinyl acetate (PVA/graphene ratio=0.1), and graphene balls were dispersed in water. The resulting slurries were then spray-dried into graphene particulates, wherein the graphene balls are coated with a metal precursor. Upon heating of the coated graphene balls at a desired temperature (typically 450-750° C.) for a desired length of time (typically 0.5-2.0 hours), the precursor became nano-scaled particles of metal (e.g. Au, Ag, and Ni metal) bonded on exterior surfaces of graphene balls. SEM images for some representative graphene balls before and after metal coating are given in FIG. 5.

In order to determine the relative stability of the graphene ball/metal mixture anode structure, the voltage profiles of symmetric layered Li-graphene ball/metal electrode cells, symmetric layered Li-graphene ball (metal free) electrode cells, and the bare Li foil counterparts were obtained through over 300 cycles at nominal current density of 1 mA/cm$^2$. The graphene particulate-containing layer electrode was made by the conventional slurry coating procedure using PVDF as a binder.

The symmetric layered Li-graphene ball/metal electrode cells exhibited stable voltage profiles with negligible hysteresis, whereas the bare Li foils displayed a rapid increase in hysteresis during cycling, by 90% after less than 100 cycles. The hysteresis growth rate of the symmetric layered Li-graphene (metal free) electrode cell is significantly greater than that of the symmetric layered Li-graphene ball/metal electrode cell, but lower than that of the bare Li foil cell. For symmetric layered Li-graphene ball/metal electrode cells, flat voltage plateau at both the charging and discharging states can be retained throughout the whole cycle without obvious increases in hysteresis. This is a significant improvement compared with bare Li electrodes, which showed fluctuating voltage profiles with consistently higher overpotential at both the initial and final stages of each stripping/plating process. After 350 cycles, there is no sign of dendrite formation and the lithium deposition is very even in symmetric layered Li-graphene ball/metal electrode cells. For the symmetric layered Li-graphene (metal-free) electrode cells, some lithium tends to deposit unevenly on exterior surfaces of graphene balls. Typically, for bare Li foil electrodes, dendrite begins to develop in less than 30 cycles.

Example 2: Preparation of Single-Layer Graphene Sheets and Graphene Balls from Meso-Carbon Micro-Beads (MCMBs)

Meso-carbon microbeads (MCMBs) were supplied from China Steel Chemical Co., Kaohsiung, Taiwan. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultra-sonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours. The GO sheets contain oxygen proportion of approximately 35%-47% by weight for oxidation treatment periods of 48-96 hours.

The GO/water suspension was then spray-dried to obtain graphene oxide balls, which were thermally reduced at 700° C. to obtain RGO balls. The RGO balls, along with a binder (SBR), were dispersed in water to form a slurry. The slurry was cast onto a surface of Cu foil to obtain a layer of graphene balls (RGO balls) bonded on the Cu foil surface.

Silver nanowires (AgNW) and fine Cu particles, respectively, were dispersed in water, along with SBR binder, to form two slurry samples. These slurries were coated onto the graphene ball layer and, upon water removal, yielded a layer comprising AgNWs and Cu particles, respectively, overlaying the graphene ball layer.

Example 3: Preparation of Polymer-Bonded Pristine Graphene Balls (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to graphene balls having a higher thermal or electrical conductivity. Pristine graphene sheets were produced by using the direct ultra-sonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are substantially no other non-carbon elements.

The graphene-water suspension was then mixed with a solution that contained PEDOT/PSS dissolved in water to make a slurry. It may be noted that Poly(3,4-ethylenedioxythiophene):polystyrene sulfonate (PEDOT:PSS) is a polymer mixture of two ionomers. One component is made up of sodium polystyrene sulfonate, which is a sulfonated polystyrene. Part of the sulfonyl groups are deprotonated and carry a negative charge. The other component poly(3,4-ethylenedioxythiophene) or PEDOT is a conjugated polymer, polythiophene, which carries positive charges. Together the two charged polymers form a macromolecular salt, which is soluble in water. The slurry was then spray-dried to obtain graphene balls having graphene sheets bonded by PEDOT/PSS.

Fine Zn particles and Ni particles, respectively, were used as Na ion-attracting metals. Three layers of active materials (graphene ball layer+metal layer+graphene ball layer) were deposited sequentially onto a Cu foil-based current collector as an anode in sodium-ion batteries. Electrochemical characterization was conducted by using CR2032-type coin cell wherein Na metal was used as the counter and reference electrodes. To make an anode, active material (metal particles or graphene balls for different layers; 85 wt %), Super P (conductive additive; 7 wt %) and PAA binder (8 wt %) were mixed in mortar and then N-methyl-2-pyrrolidone (NMP) was added to prepare a slurry. The slurry was casted on Cu foil and dried in a vacuum oven at 150° C. for 10 h. Disc-shape electrodes were punched into 12 mm size. The average loading mass of electrodes was 3.2 mg/cm$^2$. Further, 1 M solution of NaPF6 in ethylene carbonate (EC) and diethyl carbonate (DEC) (1:1, v/v) with 5% flouro-ethylene carbonate (FEC) was employed as an electrolyte, and glass fiber fabric was used as a porous separator. The coin cell was fabricated in an Ar-filled glove box. Galvanostatic charge-discharge cycling test was performed between 0.01 and 2 V vs. Na$^+$/Na at various rates or current densities (0.1 to 2 A/g).

Example 4: Preparation of Graphene Balls from Graphene Fluoride

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, but ethanol, 1-propanol, 2-propanol, 1-butanol, tert-butanol, isoamyl alcohol all can be used) and subjected to an ultrasound treatment (280 W) for 30 min, leading to the formation of homogeneous yellowish dispersion. The dispersion was spray-dried into graphene balls.

Silver nano-wires were then mixed with graphene balls to form a mixer layer using a CMC binder in water. The resulting slurry was cast onto a stainless steel foil (as a current collector) to make an anode for a lithium metal battery.

Example 5: Preparation of Metal-Containing Graphene Balls from Nitrogenated Graphene Graphene oxide (GO), synthesized in Example 1, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained have nitrogen contents of 14.7, 18.2 and 17.5 wt % respectively as measured by elemental analysis. These nitrogenated graphene sheets remain dispersible in water. The resulting suspensions were then spray-dried to obtain graphene balls.

Graphene balls, along with CMC binder, were dispersed in water to make a slurry, which was cast onto a Cu foil surface to make a graphene ball layer. Subsequently, a mixture of Zn and Cu particles (50/50 volume ratio), along with CMC binder in water, were coated onto the graphene ball layer to make a metal layer. Water was then removed from the structure to obtain an anode.

Example 6: Evaluation of Various Lithium Metal and Sodium Metal Cells

In a conventional cell, an electrode (e.g. cathode) is typically composed of 85% an electrode active material (e.g. $Li_xV_2O_5$, NCM, NCA, sodium polysulfide, lithium polysulfide, etc.), 5% Super-P (acetylene black-based conductive additive), and 10% PTFE, which were mixed in NMP solvent to form a slurry. The slurry was then coated on Al foil. The thickness of electrode was around 50-150 μm. A wide variety of cathode active materials were implemented to produce lithium metal batteries and sodium metal batteries. Anode layers were similarly made using a mixture of metal particles and graphene balls as an anode layer or multiple discrete metal layer(s) and graphene ball layer(s) overlaid together as an anode structure.

For each sample, both coin-size and pouch cells were assembled in a glove box. The charge storage capacity was measured with galvanostatic experiments using an Arbin SCTS electrochemical testing instrument. Cyclic voltammetry (CV) and electrochemical impedance spectroscopy (EIS) were conducted on an electrochemical workstation (CHI 660 System, USA).

For each sample, several current density (representing charge/discharge rates) were imposed to determine the electrochemical responses, allowing for calculations of energy density and power density values required of the construction of a Ragone plot (power density vs. energy density).

Figure 6:
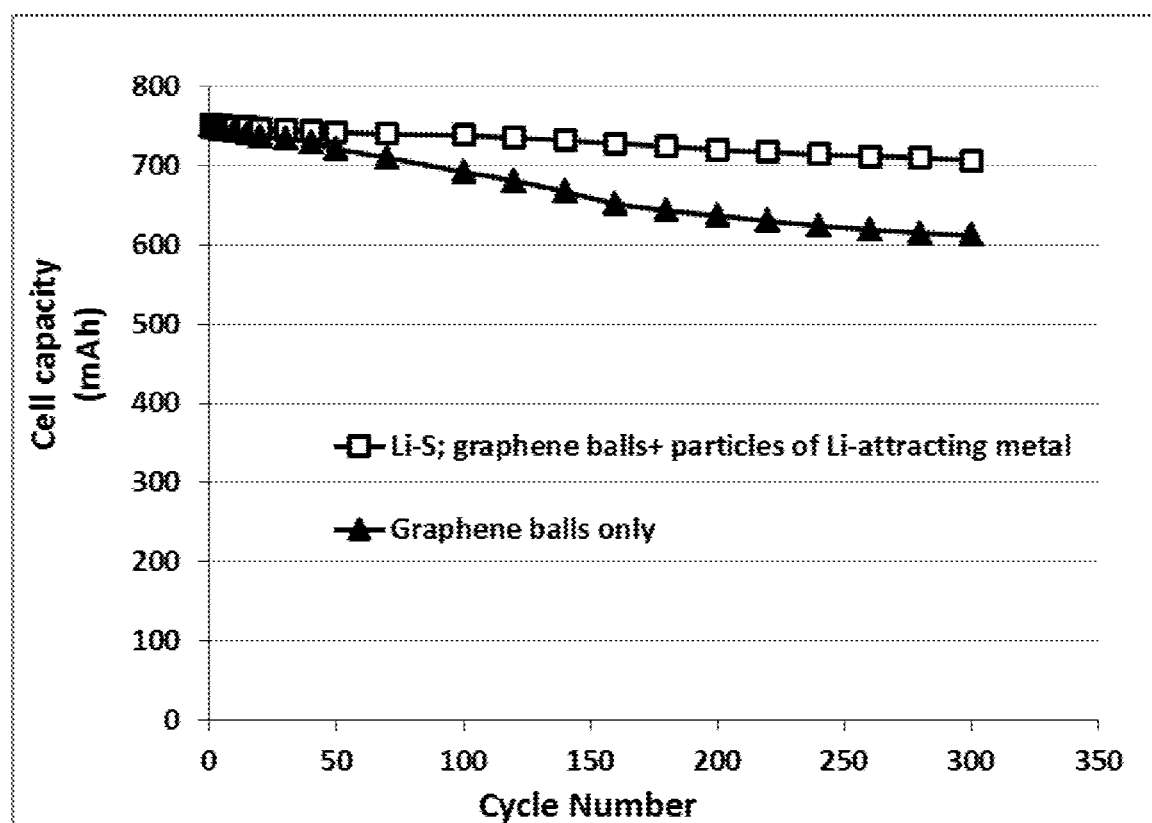
FIG. 6 The cycling behaviors of two sets of lithium metal cells: (a) first cell containing nitrogen-doped graphene balls containing therein Zn nano particles, in physical contact with a lithium foil, as the anode active material; (b) the second cell containing no lithium-attracting metal (Zn).

The data on the gravimetric power density vs. energy density of two sets of lithium metal cells were obtained: (a) first cell containing a mixture layer of Zn particles and nitrogenated graphene balls bonded by PVDF, in physical contact with a lithium foil, as the anode active material; (b) the second cell containing no lithium-attracting metal (Zn) particles outside of the graphene balls. These data indicate that the energy density and power density ranges of these two cells are comparable. However, SEM examination of the cell samples, taken after 30 charge-discharge cycles, indicates that the sample containing a Li-attracting metal has essentially all the lithium ions returning from the cathode during charge being uniformly distributed outside around the graphene balls, having no tendency to form lithium dendrites. In some cases, smooth lithium metal layer was deposited on the current collector surface underneath the graphene ball-metal mixture layer. In contrast, for the cell containing no lithium-attracting metal around the graphene balls, lithium metal tends to get re-plated on external surfaces of graphene balls and on the current collector in a less uniform manner. Further surprisingly, as shown in FIG. 6, the cell comprising a mixture of Zn particles and graphene balls exhibits a more stable cycling behavior.

Figure 7:
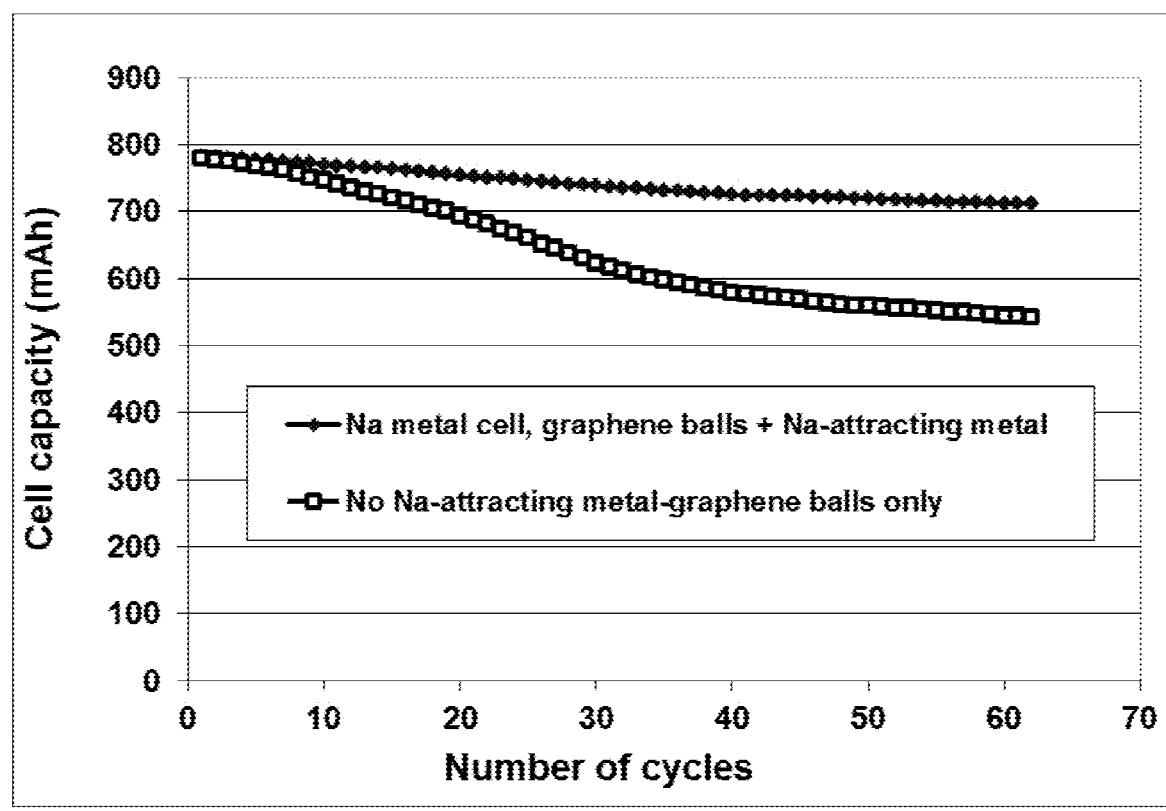
FIG. 7 The battery cell capacity decay curves of two sodium metal cells: one cell comprising Mg-containing pristine graphene balls and a sheet of Na foil as the anode active material and $NaFePO_4$ as the cathode active material, and the other cell containing pristine graphene balls (but no sodium-attracting metal included therein) and a sheet of Na foil as the anode active material.

Shown in FIG. 7 are battery cell capacity decay curves of two sodium metal cells. One cell contains a layer of Mg-coated pristine graphene balls (Mg coated on exterior surfaces of graphene balls) and a sheet of Na foil as the anode active material, and $NaFePO_4$ as the cathode active material. For comparison, a sodium metal cell containing pristine graphene balls (but no sodium-attracting metal coating or particles outside of the graphene balls) and a sheet of Na foil as the anode active material is also investigated. The cell having a sodium-attracting metal shows a significantly more stable cycling behavior.

In conclusion, we have successfully developed a new, novel, unexpected, and patently distinct class of metal-containing graphene balls or particulates that can be used in a lithium metal battery or sodium metal battery for overcoming the dendrite issues. This class of new materials has now made it possible to use lithium metal and sodium metal batteries that have much higher energy densities as compared to the conventional lithium-ion cells. Additionally, the graphene particulates, preloaded with lithium or sodium, may be used as a pre-lithiating agent or pre-sodiating agent for a conventional lithium-ion battery or sodium-ion battery, respectively.

The invention claimed is:

1. An anode for a lithium battery or sodium battery, said anode comprising multiple porous graphene balls and multiple particles or coating of a lithium-attracting metal or sodium-attracting metal at a graphene ball-to-metal volume ratio from 2/98 to 98/2, wherein each porous graphene ball of the multiple porous graphene balls comprises a plurality of graphene sheets forming into said ball having a diameter from 100 nm to 20 μm and a pore or multiple pores having a pore volume fraction from 10% to 99.9% based on the total graphene ball volume, and wherein said lithium-attracting metal or sodium-attracting metal, having a diameter or thickness from 1 nm to 20 μm, is selected from Au, Ag, Mg, Zn, Ti, K, Al, Fe, Mn, Co, Ni, Sn, V, Cr, an alloy thereof, or a combination thereof and is disposed outside of the graphene balls or on exterior surfaces of the graphene balls.

2. The anode of claim 1, further comprising a current collector having two primary surfaces, wherein said multiple porous graphene balls and multiple particles of a lithium-attracting metal or sodium-attracting metal form at least a layer of a mixture of graphene balls and metal particles that is deposited on one or two primary surfaces of the current collector.

3. The anode of claim 1, further comprising a current collector having two primary surfaces, wherein the multiple particles or coating of a lithium-attracting metal or sodium-attracting metal are deposited on exterior surfaces of the graphene balls to form a layer or two layers of metal-decorated or metal-coated graphene balls that are deposited on one primary or two primary surfaces of the current collector.

4. The anode of claim 1, further comprising a current collector having two primary surfaces, wherein said multiple porous graphene balls form a discrete graphene ball layer and said multiple particles or coating of a lithium-attracting metal or sodium-attracting metal form a discrete metal layer overlaying the discrete graphene ball layer and wherein either the discrete metal layer or the graphene ball layer is deposited on or supported by the current collector.

5. The anode of claim 1, further comprising a current collector having two primary surfaces, wherein said multiple porous graphene balls form at least a discrete graphene ball layer and said multiple particles or coating of a lithium-attracting metal or sodium-attracting metal form at least one discrete metal layer and wherein at least one of the two primary surfaces is deposited with one discrete graphene ball layer overlaying one metal layer.

6. The anode of claim 5, wherein the discrete metal layer is further overlaid with one graphene ball layer to form a three-layer structure of graphene ball layer/metal layer/graphene ball layer and one or two of the primary surfaces is each deposited with such a three-layer structure.

7. The anode of claim 1, wherein said graphene sheets contain single-layer or few-layer graphene, wherein said few-layer graphene sheets have 2-10 layers of stacked graphene planes having an inter-plane spacing $d_{002}$ from 0.3354 nm to 0.6 nm as measured by X-ray diffraction and said single-layer or few-layer graphene sheets contain a pristine graphene material having essentially zero % of non-carbon elements, or a non-pristine graphene material having 0.001% to 25% by weight of non-carbon elements.

8. The anode of claim 7, wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

9. The anode of claim 1, wherein said graphene ball further comprises 0.01% to 40% by weight of a binder or matrix material that holds said multiple graphene sheets together as a composite graphene ball.

10. The anode of claim 9, wherein said binder or matrix material comprises an electron-conducting or lithium ion-conducting material.

11. The anode of claim 10, wherein said electron-conducting material is selected from an intrinsically conducting polymer, a pitch, a metal, a combination thereof, or a combination thereof with carbon, wherein said metal does not include Au, Ag, Mg, Zn, Ti, K, Al, Fe, Mn, Co, Ni, Sn, V, Cr, or an alloy thereof.

12. The anode of claim 11, wherein said intrinsically conducting polymer is selected from polyaniline, polypyrrole, polythiophene, polyfuran, polyacetylene, a bi-cyclic polymer, a sulfonated derivative thereof, or a combination thereof.

13. The anode of claim 10, wherein said lithium ion-conducting material is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

14. The anode of claim 10, wherein said lithium ion-conducting material contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium (LiN($CF_3SO_2$)$_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

15. The anode of claim 10, wherein said lithium ion conducting material comprises a lithium ion-conducting polymer selected from polydially dimethyl-ammonium chloride (PDDA), 4-styrenesulfonate (PSS), polyethylene glycol tert-octylphenylether (PEGPE), polyallyl amine (PAAm), poly(ethylene oxide) (PEO), Polypropylene oxide (PPO), poly(acrylonitrile) (PAN), poly(methyl methacrylate) (PMMA), poly(vinylidene fluoride) (PVdF), Poly bismethoxy ethoxyethoxide-phosphazenex, Polyvinyl chloride, Polydimethylsiloxane, poly(vinylidene fluoride)-hexafluoropropylene (PVDF-HFP), a sulfonated derivative thereof, or a combination thereof.

16. The anode of claim 10, wherein said lithium ion-conducting material comprises a sulfonated polymer.

17. The anode of claim 1, wherein said graphene balls further contain therein an electron-conducting material selected from an expanded graphite flake, carbon nanotube, carbon nano-fiber, carbon fiber, carbon particle, graphite particle, carbon black, acetylene black, pitch, or a combination thereof.

18. The anode of claim 1, wherein the anode further comprises lithium metal or sodium metal in physical contact with the lithium-attracting metal or sodium-attracting metal to form a lithium-preloaded or sodium-preloaded graphene particulate.

19. The anode of claim 1, wherein said graphene ball has a density from 0.005 to 1.7 g/cm³ and a specific surface area from 50 to 2,630 m²/g.

20. An alkali metal battery comprising a cathode, the anode of claim 1, an optional lithium source or an optional sodium source in ionic contact with said anode, and an electrolyte in ionic contact with both said cathode and said anode.

21. The alkali metal battery of claim 20, wherein said lithium source is selected from foil, particles, or filaments of lithium metal or lithium alloy having no less than 80% by weight of lithium element in said lithium alloy; or wherein said sodium source is selected from foil, particles, or filaments of sodium metal or sodium alloy having no less than 80% by weight of sodium element in said sodium alloy.

22. The alkali metal battery of claim 20, which is a lithium metal battery, lithium-sulfur battery, lithium-selenium battery, lithium-air battery, sodium metal battery, sodium-sulfur battery, sodium-selenium battery, or sodium-air battery.

23. A lithium-ion battery comprising the anode of claim 1, a cathode, an electrolyte in ionic contact with said anode and said cathode, wherein said cathode comprises a lithium-containing cathode active material that releases lithium ions into said electrolyte when the battery is charged and the released lithium ions move to the anode and react with said metal or form an alloy with said metal in the anode.

24. A sodium-ion battery comprising the anode of claim 1, a cathode, an electrolyte in ionic contact with said anode and said cathode, wherein said cathode comprises a sodium-containing cathode active material that releases sodium ions into said electrolyte when the battery is charged and the released sodium ions move to the anode and react with said metal or form an alloy with said metal in the anode.

25. A process for producing the anode of claim 1, the process comprising: (a) providing a slurry comprising a mixture of multiple graphene balls and a lithium-attracting metal or sodium-attracting metal, and an optional binder or adhesive dispersed/dissolved in a liquid medium, wherein the lithium-attracting or sodium-attracting metal is selected from Au, Ag, Mg, Zn, Ti, Al, Fe, Mn, Co, Ni, Sn, V, Cr, an alloy thereof, or a combination thereof; and (b) dispensing and depositing the slurry onto a surface of a current collector and removing the liquid medium to form the anode.

26. The process of claim 25, wherein Step (a) of providing comprises a procedure of depositing particles or coating of the lithium-attracting metal or sodium-attracting metal onto exterior surfaces of the multiple graphene balls to obtain the mixture.

27. The process of claim 26, wherein the procedure of depositing or coating comprises a procedure selected from melt dipping, solution deposition, chemical vapor deposition, physical vapor deposition, sputtering, electrochemical deposition, spray coating, plasma coating, or a combination thereof.

28. The process of claim 25, wherein the graphene balls in Step (a) are produced from a procedure selected from ball milling, spray drying, pan-coating, air-suspension coating, centrifugal extrusion, vibration nozzle coating, or in-situ polymerization.

29. The process of claim 25, wherein the process further comprises a step of impregnating lithium metal or sodium metal into the anode to form lithium-preloaded or sodium-preloaded anode, wherein the lithium metal or sodium metal is in physical contact with the lithium-attracting metal or sodium-attracting metal.

30. The process of claim 25, wherein the process further comprises a step of incorporating the anode in a lithium metal battery, lithium-sulfur battery, lithium-selenium battery, lithium-air battery, sodium metal battery, sodium-sulfur battery, sodium-selenium battery, or sodium-air battery.

31. A process for producing the anode of claim 1, the process comprising (a) depositing a metal layer of a lithium-attracting metal or sodium-attracting metal, in the form of a metal coating or discrete multiple particles, onto a surface of a current collector, wherein the lithium-attracting or sodium-attracting metal is selected from Au, Ag, Mg, Zn, Ti, Al, Fe, Mn, Co, Ni, Sn, V, Cr, an alloy thereof, or a combination thereof; and (b) depositing a layer of multiple graphene balls onto a surface of the metal layer to form a multiple-layer anode.

32. The process of claim 31, further comprising a step of depositing another layer of a lithium-attracting metal or sodium-attracting metal, in the form of a metal coating or discrete multiple particles, onto the layer of multiple graphene balls.

33. A process for producing the anode of claim 1, the process comprising (a) depositing a layer of multiple graphene balls onto a surface of a current collector; and (b) depositing a metal layer of a lithium-attracting metal or sodium-attracting metal, in the form of a metal coating or discrete multiple particles, onto the graphene ball layer to form a multiple-layer anode, wherein the lithium-attracting or sodium-attracting metal is selected from Au, Ag, Mg, Zn, Ti, Al, Fe, Mn, Co, Ni, Sn, V, Cr, an alloy thereof, or a combination thereof.

34. The process of claim 33, further comprising a step of depositing another layer of multiple graphene balls onto a surface of the metal layer.

\* \* \* \* \*